US011784342B2

(12) United States Patent
Nishio et al.

(10) Patent No.: US 11,784,342 B2
(45) Date of Patent: *Oct. 10, 2023

(54) NONAQUEOUS ELECTROLYTE SECONDARY BATTERY

(71) Applicants: Mitsubishi Chemical Corporation, Tokyo (JP); MU IONIC SOLUTIONS CORPORATION, Tokyo (JP)

(72) Inventors: Koichi Nishio, Chiyoda-ku (JP); Jungmin Kim, Chiyoda-ku (JP)

(73) Assignees: Mitsubishi Chemical Corporation, Tokyo (JP); MU IONIC SOLUTIONS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,359

(22) Filed: Aug. 4, 2022

(65) Prior Publication Data
US 2022/0384840 A1 Dec. 1, 2022

Related U.S. Application Data

(63) Continuation of application No. 16/784,505, filed on Feb. 7, 2020, now Pat. No. 11,450,880, which is a continuation of application No. PCT/JP2018/029618, filed on Aug. 7, 2018.

(30) Foreign Application Priority Data

Aug. 10, 2017 (JP) ................................ 2017-155379

(51) Int. Cl.
H01M 4/00 (2006.01)
H01M 10/052 (2010.01)
H01M 4/36 (2006.01)
H01M 4/525 (2010.01)
H01M 4/62 (2006.01)
H01M 10/0567 (2010.01)
H01M 10/0569 (2010.01)
H01M 4/02 (2006.01)

(52) U.S. Cl.
CPC ......... *H01M 10/052* (2013.01); *H01M 4/364* (2013.01); *H01M 4/366* (2013.01); *H01M 4/525* (2013.01); *H01M 4/621* (2013.01); *H01M 10/0567* (2013.01); *H01M 10/0569* (2013.01); *H01M 2004/027* (2013.01); *H01M 2004/028* (2013.01)

(58) Field of Classification Search
CPC ........ H01M 4/00; H01M 10/052; H01M 4/36; H01M 4/62; H01M 10/0567; H01M 10/0569; H01M 4/02
See application file for complete search history.

(56) References Cited

U.S. PATENT DOCUMENTS

| 11,450,880 | B2* | 9/2022 | Nishio ................. H01M 4/621 |
| 2009/0059106 | A1 | 3/2009 | Kitadani et al. |
| 2010/0015514 | A1 | 1/2010 | Miyagi et al. |
| 2011/0256437 | A1 | 10/2011 | Katsuki |
| 2014/0203787 | A1 | 7/2014 | Yamamoto |
| 2015/0010811 | A1 | 1/2015 | Egorov et al. |
| 2015/0207142 | A1 | 7/2015 | Takijiri et al. |
| 2015/0243970 | A1 | 8/2015 | Choi |
| 2016/0118649 | A1 | 4/2016 | Yamamoto et al. |
| 2016/0372802 | A1 | 12/2016 | Chiang et al. |
| 2018/0114651 | A1 | 4/2018 | Shimamoto et al. |
| 2018/0159173 | A1 | 6/2018 | Chika |
| 2018/0277900 | A1 | 9/2018 | Abe et al. |
| 2020/0168908 | A1 | 5/2020 | Kim et al. |

FOREIGN PATENT DOCUMENTS

| CN | 101295804 B | 2/2013 |
| CN | 103384017 | 11/2013 |
| CN | 105047996 | 8/2017 |
| JP | 11-067270 A | 3/1999 |

(Continued)

OTHER PUBLICATIONS

Indonesian Office Action dated Jul. 18, 2022 in Indonesian Patent Application No. P00202001851 (with English translation), 6 pages.
International Search Report dated Sep. 18, 2018 in PCT/JP2018/029618 filed Aug. 7, 2018, 2 pages.
Written Opinion of the International Searching Authority dated Sep. 18, 2018 in PCT/JP2018/029618 (English Translation only), 6 pages.
Office Action issued in corresponding Japanese patent Application No. 2019-535676 dated Apr. 12, 2022 (with English-language Translation).
Extended European Search Report issued in EP 18 84 5244 dated Jun. 18, 2020, 7 pages.
Indian Office Action dated Jun. 4, 2021 in Indian Patent Patent Application No. 202017006316, 5 pages.

(Continued)

*Primary Examiner* — Cynthia H Kelly
*Assistant Examiner* — Monique M Wills
(74) *Attorney, Agent, or Firm* — Oblon, McClelland, Maier & Neustadt, L.L.P.

(57) ABSTRACT

Provided is a nonaqueous electrolyte secondary battery, including a positive electrode with a positive electrode active material capable of absorbing and releasing a metal ion; a negative electrode with a negative electrode active material capable of absorbing and releasing a metal ion; and a nonaqueous electrolyte solution; wherein the positive electrode active material includes a lithium transition metal compound, and the positive electrode active material includes at least Ni, Mn and Co, wherein the molar ratio of Mn/(Ni+Mn+Co) is larger than 0 and not larger than 0.32, the molar ratio of Ni/(Ni+Mn+Co) is 0.55 or more, the plate density of the positive electrode is 3.0 g/cm$^3$ or more; and the nonaqueous electrolyte solution includes a monofluorophosphate and/or a difluorophosphate. A total content of the monofluorophosphate and/or difluorophosphate is 0.01% by mass or more in terms of the concentration in the nonaqueous electrolyte solution.

12 Claims, No Drawings

(56) References Cited

FOREIGN PATENT DOCUMENTS

| | | |
|---|---|---|
| JP | 2007-242288 A | 9/2007 |
| JP | 2009-75215 A | 4/2009 |
| JP | 2011-060541 A | 3/2011 |
| JP | 2011-124086 A | 6/2011 |
| JP | 2011-228073 A | 11/2011 |
| JP | 2015-18802 A | 1/2015 |
| JP | 2015-207538 A | 11/2015 |
| JP | 2017-69132 A | 4/2017 |
| JP | 2019-509605 A | 4/2019 |
| WO | WO 2007/055087 A1 | 5/2007 |
| WO | WO 2014/034043 A1 | 3/2014 |
| WO | WO 2016/116867 A1 | 7/2016 |
| WO | WO 2016/166912 A1 | 10/2016 |
| WO | WO 2016/189769 A1 | 12/2016 |
| WO | WO 2017/057078 A1 | 4/2017 |

OTHER PUBLICATIONS

Extended Search Report issued in corresponding European Patent Application No. 22160731.0 D dated May 31, 2022.
Office Action dated May 19, 2023, in corresponding Indonesian Patent Application No. P00202213760 (w/English translation).
Office Action dated Aug. 29, 2023, in corresponding Japanese Patent Application No. 2022-168011. (with Machine English-language Translation).

* cited by examiner

NONAQUEOUS ELECTROLYTE SECONDARY BATTERY

CROSS-REFERENCE TO RELATED APPLICATION

This application is a continuation application of prior U.S. application Ser. No. 16/784,505, filed Feb. 7, 2020; which is a continuation of International Application PCT/JP2018/029618, filed on Aug. 7, 2018, and designated the U.S., and claims priority from Japanese Patent Application 2017-155379 which was filed on Aug. 10, 2017, the entire contents of which all are incorporated herein by reference.

TECHNICAL FIELD

The present invention relates to a nonaqueous electrolyte secondary battery.

BACKGROUND ART

Since a lithium nonaqueous electrolyte secondary battery using a lithium-containing transition metal oxide as a positive electrode, and a nonaqueous solvent as an electrolyte solution can achieve high energy density, it has been applied to a wide range of uses from a small-sized power supply for a mobile phone, a laptop computer, or the like, to a large sized power supply for an automobile or railway, or load leveling. However, in recent year, the demand on a nonaqueous electrolyte secondary battery for higher performance has become more strenuous, and improvements of various characteristics have been strongly demanded.

For example, Patent Literature 1 describes that a nonaqueous electrolyte secondary battery using an electrolyte solution containing a monofluorophosphate, a difluorophosphate, or the like can exhibit high capacity, long life, and high output power, even when it is applied to a large-sized battery.

Patent Literature 2 describes that a positive electrode active material for a non-aqueous electrolyte secondary battery having excellent cycle characteristics and long life can be stably provided by suppressing disorder in a crystal of a primary particle of a lithium transition metal compound to reduce the resistance of the inside of the crystal, because, when a non-aqueous electrolyte secondary battery is used as a power source for a hybrid vehicle or an electric vehicle, the output characteristics and cycle characteristics are extremely important.

CITATION LIST

Patent Literature

[Patent Literature 1] International Publication No. WO 2007/055087
[Patent Literature 2] Japanese Patent Application Laid-Open No. 2007-242288

SUMMARY OF INVENTION

Technical Problem

However, despite the recent demand for improvement of the characteristics of a nonaqueous electrolyte secondary battery, none of the above-mentioned conventional techniques have yet achieved various performances of a nonaqueous electrolyte secondary battery all together at high levels. For example, with respect to the nonaqueous electrolyte secondary battery of Patent Literature 1, further improvement of the battery capacity and safety has been required, and with respect to the nonaqueous electrolyte secondary battery of Patent Literature 2, the capacity retention rate after high temperature storage is low, and the amount of gas from storage, and the dissolution amount of a metal after a high temperature storage are large, and therefore improvement of the high temperature life and enhancement of the safety have been required. In particular, in the case of a large sized battery for an automobile, or the like, the battery itself may be placed in a high temperature environment due to heat from the service environment, such as a heat of motor or solar heat. Therefore, a nonaqueous electrolyte secondary battery, which is excellent in high temperature characteristics under a high temperature (for example, the capacity retention rate after high temperature storage is high, and the amount of gas from storage after high temperature storage is small), the safety is high (for example, the resistance after high temperature storage is low, the amount of metal dissolution from a positive electrode is low, and the amount of heat generation at a high temperature is small), has been desired.

An object of the present invention is to provide a nonaqueous electrolyte secondary battery, in which the capacity retention rate after high temperature storage is high, the gas amount after high temperature storage is small, the resistance after high temperature storage is low, the amount of metal dissolution from a positive electrode is small, and the amount of heat generation at a high temperature is small.

Solution to Problem

To achieve the object, the present inventors have studied diligently to find at last that a nonaqueous electrolyte secondary battery in which the capacity retention rate after high temperature storage is high, the gas amount after high temperature storage is small, the resistance after high temperature storage is low, the amount of metal dissolution from a positive electrode is small, and the amount of heat generation at a high temperature is small can be obtained, when the nonaqueous electrolyte secondary battery is produced using a specific positive electrode and a nonaqueous electrolyte solution containing a specific compound, thereby completing the present invention.

That is, the gist of the present invention is as follows.
[1] A nonaqueous electrolyte secondary battery comprising a positive electrode with a positive electrode active material capable of absorbing and releasing a metal ion; a negative electrode with a negative electrode active material capable of absorbing and releasing a metal ion; and a nonaqueous electrolyte solution; wherein
the positive electrode active material comprises a lithium transition metal compound, and the positive electrode active material comprises at least Ni, Mn and Co, wherein a molar ratio of Mn/(Ni+Mn+Co) is larger than 0 and not larger than 0.32, a molar ratio of Ni/(Ni+Mn+Co) is 0.45 or more, the plate density of the positive electrode is 3.0 g/cm$^3$ or more; and the nonaqueous electrolyte solution comprises a monofluorophosphate and/or a difluorophosphate.
[2] The nonaqueous electrolyte secondary battery according to [1], wherein the positive electrode active material comprises a lithium transition metal compound represented by the following Formula (I):

$$Li_{1+x}MO_2 \qquad (I)$$

(in the above Formula (I), x is from −0.05 to 0.06, and M comprises at least Ni, Mn and Co.)

[3] The nonaqueous electrolyte secondary battery according to [2], wherein the x is 0.028 or less.

[4] The nonaqueous electrolyte secondary battery according to any one of [1] to [3], wherein the molar ratio of Mn/(Ni+Mn+Co) is 0.28 or less.

[5] The nonaqueous electrolyte secondary battery according to any one of [1] to [4], wherein the molar ratio of Ni/(Ni+Mn+Co) is 0.55 or more.

[6] The nonaqueous electrolyte secondary battery according to any one of [1] to [5], wherein a plate density of the positive electrode is 3.2 g/cm$^3$ or more.

[7] The nonaqueous electrolyte secondary battery according to any one of [1] to [6], wherein the positive electrode active material further contains a sulfate salt.

[8] The nonaqueous electrolyte secondary battery according to [7], wherein the amount of the sulfate salt contained in the positive electrode active material is 15 μmol/g or more.

[9] The nonaqueous electrolyte secondary battery according to any one of [1] to [8], wherein an average Ni valence of the lithium transition metal compound is 2.1 or more in an uncharged state.

[10] The nonaqueous electrolyte secondary battery according to any one of [1] to [9], wherein a pH of an aqueous solution of the lithium transition metal compound is 11 or higher based on a liquid temperature of 25° C.

[11] The nonaqueous electrolyte secondary battery according to any one of [1] to [10], wherein the positive electrode active material contains a carbonate salt at 10 μmol/g or more.

[12] The nonaqueous electrolyte secondary battery according to any one of [1] to [11], wherein a tap density of the lithium transition metal compound is 1.8 g/cm$^3$ or more.

Advantageous Effects of Invention

According to the present invention, a nonaqueous electrolyte secondary battery, in which the capacity retention rate after high temperature storage is high, the gas amount after high temperature storage is small, the resistance after high temperature storage is low, the amount of metal dissolution from a positive electrode is small, and the amount of heat generation at a high temperature is small, can be obtained.

DESCRIPTION OF EMBODIMENTS

An embodiment for implementing the present invention will be described below in detail, provided that the description described below is an example of embodiments of the present invention (representative example), and the present invention is not limited to such contents without departing from the gist of the invention as defined in the appended claims.

This embodiment of the present invention relates to a nonaqueous electrolyte secondary battery provided with a positive electrode with a positive electrode active material capable of absorbing and releasing a metal ion, a negative electrode with a negative electrode active material capable of absorbing and releasing a metal ion, and a nonaqueous electrolyte solution. Each component will be described below.

[1. Nonaqueous Electrolyte Solution]

A nonaqueous electrolyte solution used in a nonaqueous electrolyte secondary battery of the present invention includes an electrolyte and a nonaqueous solvent dissolving it similarly to a general nonaqueous electrolyte solution, and is mainly characterized in that it contains a monofluorophosphate and/or a difluorophosphate.

[1-1. Monofluorophosphate, and Difluorophosphate]

There is no particular restriction on a monofluorophosphate and a difluorophosphate, insofar as they are respectively salts having at least one monofluorophosphate structure or difluorophosphate structure in the molecule. When an electrolyte solution containing one or more selected from a monofluorophosphate and a difluorophosphate is used, the durability of a nonaqueous electrolyte secondary battery can be improved. Further, when the electrolyte solution is applied to a nonaqueous secondary battery provided with a specific positive electrode described later, a nonaqueous electrolyte secondary battery in which the capacity retention rate after high temperature storage is high, the gas amount after high temperature storage is small, the resistance after high temperature storage is low, the amount of metal dissolution from a positive electrode is small, and the amount of heat generation at a high temperature is small can be obtained.

There is no particular restriction on a counter cation for a monofluorophosphate and a difluorophosphate, and examples thereof include lithium, sodium, potassium, magnesium, calcium, and an ammonium represented by $NR^{121}R^{122}R^{123}R^{124}$ (wherein $R^{121}$ to $R^{124}$ are independently hydrogen or an organic group having 1 to 12 carbon atoms). There is no particular restriction on the organic group having 1 to 12 carbon atoms represented by $R^{121}$ to $R^{124}$ of the above ammonium, and examples thereof include an alkyl group optionally substituted with a fluorine atom, a cycloalkyl group optionally substituted with a halogen atom or an alkyl group, an aryl group optionally substituted with a halogen atom or an alkyl group, and a nitrogen atom-containing heterocyclic group optionally having a substituent. Among others, $R^{121}$ to $R^{124}$ are preferably independently a hydrogen atom, an alkyl group, a cycloalkyl group, or a nitrogen atom-containing heterocyclic group. As a counter cation, lithium, sodium, and potassium are preferable, and lithium is particularly preferable.

Examples of a monofluorophosphate or a difluorophosphate include lithium monofluorophosphate, sodium monofluorophosphate, potassium monofluorophosphate, lithium difluorophosphate, sodium difluorophosphate, and potassium difluorophosphate, and lithium monofluorophosphate and lithium difluorophosphate are preferable, and lithium difluorophosphate is more preferable.

The total content of a monofluorophosphate and a difluorophosphate is preferably 0.01% by mass or more in terms of the concentration in a nonaqueous electrolyte solution, more preferably 0.1% by mass or more, especially preferably 0.3% by mass or more, and most preferably 0.5% by mass or more. Meanwhile, it is preferably 8% by mass or less, more preferably 4% by mass or less, especially preferably 2% by mass or less, and most preferably 1.5% by mass or less. When the total content of a monofluorophosphate and a difluorophosphate is within the range, and a nonaqueous electrolyte secondary battery is produced therewith, the post-storage capacity can be large, and battery swelling or the amount of metal dissolution can be suppressed, so that it can be superior in high temperature life and safety, and increase in production cost of a nonaqueous electrolyte secondary battery can be avoided.

The monofluorophosphate and difluorophosphate may be used singly, or in an optional combination of two or more kinds thereof at an optional ratio.

In the present invention, a monofluorophosphate or a difluorophosphate includes that produced in an electrolyte solution or in a battery.

[1-2. Electrolyte]

There is no particular restriction on an electrolyte to be used in a nonaqueous electrolyte solution, and any publicly known one can be used, insofar as it is usable in a nonaqueous electrolyte secondary battery as an electrolyte. When a nonaqueous electrolyte solution is used for a lithium secondary battery, a lithium salt is usually used as an electrolyte.

Specific example of an electrolyte include an inorganic lithium salt, such as $LiClO_4$, $LiAsF_6$, $LiPF_6$, $LiBF_4$, $LiSbF_6$, $LiSO_3F$, and $LiN(FSO_2)_2$; a fluorine-containing organic lithium salt, such as $LiCF_3SO_3$, $LiN(FSO_2)(CF_3SO_2)$, $LiN(CF_3SO_2)_2$, $LiN(C_2F_5SO_2)_2$, cyclic lithium hexafluoropropane-1,3-disulfonylimide, cyclic lithium tetrafluoroethane-1,2-disulfonylimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; and a lithium salt of a dicarboxylic acid-containing complex, such as lithium bis(oxalato)borate, lithium difluorooxalatoborate, lithium tris(oxalato)phosphate, lithium difluorobis(oxalato)phosphate, and lithium tetrafluoro(oxalato)phosphate.

Among these, $LiPF_6$, $LiBF_4$, $LiSO_3F$, $LiN(FSO_2)_2$, $LiN(FSO_2)(CF_3SO_2)$, $LiN(CF_3SO_2)_2$, $LiN(C_2F_5SO_2)_2$, lithium bis(oxalato)borate, lithium difluoro(oxalato)borate, lithium tris(oxalato)phosphate, lithium difluorobis(oxalato)phosphate, and lithium tetrafluoro(oxalato)phosphate are preferable from the viewpoints of solubility and dissociation degree in a nonaqueous solvent, electrical conductivity, and characteristics of an obtained battery; and $LiPF_6$ and $LiBF_4$ are particularly preferable.

In the present invention, $LiBF_4$, $LiSO_3F$, lithium difluoro(oxalato)borate, lithium difluorobis(oxalato)phosphate, or lithium tetrafluoro(oxalato)phosphate includes that produced in an electrolyte solution or in a battery.

The electrolytes may be used singly, or in an optional combination of two or more kinds thereof at an optional ratio. In particular, it is preferable to use two kinds of specific inorganic lithium salts in combination, or to use an inorganic lithium salt and a fluorine-containing organic lithium salt in combination, because gas generation at the time of trickle charge is suppressed, or deterioration during high temperature storage is suppressed. In particular, it is preferable to use $LiPF_6$ and $LiBF_4$ in combination, or an inorganic lithium salt, such as $LiPF_6$, or $LiBF_4$, and a fluorine-containing organic lithium salt, such as $LiCF_3SO_3$, $LiN(CF_3SO_2)_2$, or $LiN(C_2F_5SO_2)_2$ in combination.

Further, when $LiPF_6$ and $LiBF_4$ are used in combination, the content of $LiBF_4$ with respect to the entire electrolyte is preferably 0.01% by mass or more and 50% by mass or less. The content is more preferably 0.05% by mass or more, and particularly preferably 0.1% by mass or more. Meanwhile, the upper limit is more preferably 20% by mass or less, further preferably 10% by mass or less, particularly preferably 5% by mass or less, and most preferably 3% by mass or less. When the ratio is in the above range, a desired effect can be easily obtained, and owing to a low dissociation degree of $LiBF_4$, increase in the resistance of an electrolyte solution can be suppressed.

Meanwhile, when an inorganic lithium salt, such as $LiPF_6$ and $LiBF_4$; and an inorganic lithium salt, such as $LiSO_3F$, and $LiN(FSO_2)_2$; or a fluorine-containing organic lithium salt, such as $LiCF_3SO_3$, $LiN(CF_3SO_2)_2$, $LiN(C_2F_5SO_2)_2$, cyclic lithium hexafluoropropane-1,3-disulfonylimide, cyclic lithium tetrafluoroethane-1,2-disulfonylimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; or a lithium salt of a dicarboxylic acid-containing complex, such as lithium bis(oxalato)borate, lithium tris(oxalato)phosphate, lithium difluorooxalatoborate, lithium tris(oxalato)phosphate, lithium difluorobis(oxalato)phosphate, and lithium tetrafluoro(oxalato)phosphate; are used in combination, the percentage of the inorganic lithium salts in the entire electrolyte is usually 70% by mass or more, preferably 80% by mass or more, and more preferably 85% by mass or more. Meanwhile, it is usually 99% by mass or less, and preferably 95% by mass or less.

The concentration of an electrolyte in a nonaqueous electrolyte solution may be optionally selected insofar as the effect of the present invention is not impaired, and it is usually 0.5 mol/L or more, preferably 0.6 mol/L or more, and more preferably 0.8 mol/L or more. Meanwhile, it is usually in a range of 3 mol/L or less, preferably 2 mol/L or less, more preferably 1.8 mol/L or less, and further preferably 1.6 mol/L or less. When the electrolyte concentration is in the above range, the electric conductivity of a nonaqueous electrolyte solution is sufficient, and decrease in the electric conductivity, namely deterioration of the performance of a nonaqueous electrolyte secondary battery, due to viscosity increase may be suppressed.

[1-3. Nonaqueous Solvent]

As a nonaqueous solvent to be contained in a nonaqueous electrolyte solution, any one of heretofore known solvents of a nonaqueous electrolyte solution may be selected appropriately.

Examples of a usually used nonaqueous solvent include a cyclic carbonate, an open-chain carbonate, an open-chain or cyclic carboxylic acid ester, an open-chain ether, and a phosphorus-containing organic solvent, a sulfur-containing organic solvent, and a fluorine-containing aromatic solvent.

Examples of a cyclic carbonate include ethylene carbonate, propylene carbonate, and butylene carbonate. The carbon number of the cyclic carbonate is usually from 3 to 6. Among the above, ethylene carbonate and propylene carbonate are preferable because an electrolyte dissolves easily owing to a high dielectric constant, so that the cycle characteristics of a nonaqueous electrolyte secondary battery to be constructed can be favorable.

Examples of an open-chain carbonate include dimethyl carbonate, ethyl methyl carbonate, diethyl carbonate, methyl n-propyl carbonate, ethyl n-propyl carbonate, and di-n-propyl carbonate. The carbon number of an alkyl group constituting the open-chain carbonate is preferably from 1 to 5, and particularly preferably from 1 to 4. Among others, dimethyl carbonate, diethyl carbonate, and ethyl methyl carbonate are preferable from the viewpoint of improving battery characteristics.

Also, an open-chain carbonate in which part of hydrogens of the alkyl group is substituted with fluorine may be included. Examples of the open-chain carbonate substituted with fluorine include bis(fluoromethyl) carbonate, bis(difluoromethyl) carbonate, bis(trifluoromethyl) carbonate, bis(2-fluoroethyl) carbonate, bis(2,2-difluoroethyl) carbonate, bis(2,2,2-trifluoroethyl) carbonate, 2-fluoroethyl methyl carbonate, 2,2-difluoroethyl methyl carbonate, and 2,2,2-trifluoroethyl methyl carbonate.

Examples of the open-chain carboxylic ester include methyl acetate, ethyl acetate, propyl acetate, isopropyl acetate, butyl acetate, sec-butyl acetate, isobutyl acetate, t-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, and ethyl pivalate, as well as an open-chain carboxylic ester which is obtained by substituting part of hydrogens of any of the afore-listed compounds with fluorine. Examples of such an open-chain carboxylic ester substituted with fluorine include methyl trifluoroacetate, ethyl trifluoroacetate, propyl trifluoroacetate, butyl trifluoroacetate, and 2,2,2-trifluoroethyl trifluoroacetate.

Among these, methyl acetate, ethyl acetate, propyl acetate, butyl acetate, methyl propionate, ethyl propionate, propyl propionate, methyl butyrate, ethyl butyrate, methyl valerate, methyl isobutyrate, ethyl isobutyrate, and methyl pivalate are preferable from the viewpoint of improvement of battery characteristics.

Examples of the cyclic carboxylic acid ester include γ-butyrolactone, γ-valerolactone, and a cyclic carboxylic acid ester, which is obtained by substituting part of hydrogens of any of the above compounds with fluorine.

Among these, γ-butyrolactone is more preferable.

Examples of the open-chain ether includes dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, 1,2-ethoxymethoxyethane, and an open-chain ether, which is obtained by substituting part of hydrogens of the afore-listed compound with fluorine.

Examples of such an open-chain ether substituted with fluorine include bis(trifluoroethoxy)ethane, ethoxytrifluoroethoxyethane, methoxytrifluoroethoxyethane, 1,1,1,2,2,3,4,5,5,5-decafluoro-3-methoxy-4-trifluoromethyl-pentane, 1,1,1,2,2,3,4,5,5,5-decafluoro-3-ethoxy-4-trifluoromethyl-pentane, 1,1,1,2,2,3,4,5,5,5-decafluoro-3-propoxy-4-trifluoromethyl-pentane, 1,1,2,2-tetrafluoroethyl-2,2,3,3-tetrafluoropropyl ether, and 2,2-difluoroethyl-2,2,3,3-tetrafluoropropyl ether.

Among these, 1,2-dimethoxyethane, and 1,2-diethoxyethane are more preferable.

Examples of the phosphorus-containing organic solvent include trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, trimethylphosphine oxide, triethylphosphine oxide, and triphenylphosphine oxide, as well as a phosphorus-containing organic solvent, which is obtained by substituting part of hydrogens of any of the afore-listed compounds with fluorine. Examples of such a phosphorus-containing organic solvent substituted with fluorine include tris(2,2,2-trifluoroethyl) phosphate, and tris(2,2,3,3,3-pentafluoropropyl) phosphate.

Examples of the sulfur-containing organic solvent include sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, and dibutyl sulfate, as well as a sulfur-containing organic solvent, which is obtained by substituting part of hydrogens of any of the afore-listed compounds with fluorine.

Examples of the fluorine-containing aromatic solvent include fluorobenzene, difluorobenzene, trifluorobenzene, tetrafluorobenzene, pentafluorobenzene, hexafluorobenzene, and benzotrifluoride.

Among the above nonaqueous solvents, it is preferable to use ethylene carbonate and/or propylene carbonate, which is a cyclic carbonate, and also to use any of the above together with an open-chain carbonate from the viewpoint of achieving both high conductivity and low viscosity of the electrolyte solution.

The nonaqueous solvents may be used singly, or in an optional combination of two or more kinds thereof at an optional ratio. In a case where two or more kinds are used in combination, for example, when a cyclic carbonate and an open-chain carbonate are used in combination, a preferred content of the open-chain carbonate in a nonaqueous solvent is usually 20% by volume or more, and preferably 40% by volume or more, however usually 95% by volume or less, and preferably 90% by volume or less. Meanwhile, a preferred content of the cyclic carbonate in a nonaqueous solvent is usually 5% by volume or more, and preferably 10% by volume or more, however usually 80% by volume or less, and preferably 60% by volume or less. When the content of the open-chain carbonate is in the above range, increase in the viscosity of a nonaqueous electrolyte solution may be suppressed, and decrease in the electric conductivity of a nonaqueous electrolyte solution due to decrease in the dissociation degree of a lithium salt serving as an electrolyte may be suppressed. Although the volume of a nonaqueous solvent is herein measured at 25° C., but when the solvent is solid at 25° C. as in the case of ethylene carbonate, the volume is measured at the melting point.

[1-4. Other Additives]

Various additives may be included to the extent the effect of the present invention be not significantly impaired. As the additives, those heretofore publicly known may be arbitrarily used. In this regard, the additives may be used singly, or in an optional combination of two or more kinds thereof at an optional ratio.

Examples of a heretofore publicly known additive which may be added to a nonaqueous electrolyte solution include a cyclic carbonates having a carbon-carbon unsaturated bond, a fluorine-containing cyclic carbonates, a compound having an isocyanate group, a sulfur-containing organic compound, a phosphorus-containing organic compound, an organic compound having a cyano group, a silicon-containing compound, an aromatic compound, a fluorine-free carboxylic acid ester, a cyclic compound having a plurality of ether bonds, a compound having the skeleton of isocyanuric acid, a borate, an oxalate, and a fluorosulfonate.

Hereinafter, each additive will be described, however some of them may have be already referred to above.

[1-4-1. Cyclic Carbonate Having Carbon-Carbon Unsaturated Bond]

There is no particular restriction on the cyclic carbonate having a carbon-carbon unsaturated bond (hereinafter sometimes referred to as "unsaturated cyclic carbonate"), insofar as it is a cyclic carbonate having a carbon-carbon double bond, or a carbon-carbon triple bond, and any unsaturated carbonate may be used. In this regard, a cyclic carbonate having an aromatic ring is deemed to be included in the unsaturated cyclic carbonate.

Examples of the unsaturated cyclic carbonate include a vinylene carbonate, an ethylene carbonate substituted with a substituent having an aromatic ring, a carbon-carbon double bond, or a carbon-carbon triple bond, a phenyl carbonate, a vinyl carbonate, an allyl carbonate, and a catechol carbonate.

Among others, examples of an unsaturated cyclic carbonate that is particularly favorable for use in combination include vinylene carbonate, methylvinylene carbonate, 4,5-dimethylvinylene carbonate, vinylvinylene carbonate, 4,5-divinylvinylene carbonate, allylvinylene carbonate, 4,5-diallylvinylene carbonate, vinylethylene carbonate, 4,5- divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate, ethynylethylene carbonate, 4,5-diethynylethylene carbonate, 4-methyl-5-ethynylethylene carbonate, and 4-vinyl-5-ethynylethylene carbonate. Vinylene carbonate, vinylethylene carbonate, and ethynylethylene carbonate are preferable, because they form a more stable interface protective film, vinylene carbonate, and vinylethylene carbonate are more preferable, and vinylene carbonate is further preferable.

There is no particular restriction on the molecular weight of the unsaturated cyclic carbonate, and it may be arbitrarily selected to the extent that the effect of the present invention be not significantly impaired. The molecular weight is preferably 80 or more, and more preferably 85 or more, however preferably 250 or less, and more preferably 150 or less. Within the range, it is easy to secure the solubility of the unsaturated cyclic carbonate in a nonaqueous electrolyte solution, and to obtain sufficiently the effect of the present invention.

There is no particular restriction on the method for producing an unsaturated cyclic carbonate, and unsaturated cyclic carbonates can be produced by an optional publicly known method.

The unsaturated cyclic carbonates may be used singly, or in an optional combination of two or more kinds thereof at an optional ratio. Further, there is no particular restriction on the blending amount of an unsaturated cyclic carbonate, and is arbitrary to the extent that the effect of the present invention is not significantly impaired. The blending amount of an unsaturated cyclic carbonate may be 0.001% by mass or more in a nonaqueous electrolyte solution as 100% by mass, preferably 0.01% by mass or more, more preferably 0.1% by mass or more, and further preferably 0.5 mass % or more, however may be 10% by mass or less, preferably 5% by mass or less, more preferably 4% by mass or less, further preferably 3% by mass or less, and particularly preferably 2% by mass or less %. Within the range, an adequate improving effect on the cycle characteristics of a nonaqueous electrolyte secondary battery is likely to be obtained, and further the high temperature storage characteristics can be superior, the gas generation amount can be small, and the discharge capacity retention rate can be superior.

[1-4-2. Fluorine-Containing Cyclic Carbonate]

Examples of the fluorine-containing cyclic carbonate include a fluorinated product of a cyclic carbonate having an alkylene group usually having a carbon number of 2 to 6, and a derivative thereof, such as a fluorinated product of ethylene carbonate (hereinafter sometimes referred to as "fluorinated ethylene carbonate"), and a derivative thereof. Examples of a derivative of a fluorinated product of ethylene carbonate include a fluorinated product of ethylene carbonate substituted with an alkyl group having a carbon number of 1 to 4. Among others, a fluorinated ethylene carbonate having a fluorine number of 1 to 8 and a derivative thereof are preferable.

By adding a fluorine-containing cyclic carbonate to an electrolyte solution, the high temperature storage characteristics and cycle characteristics of a battery using the electrolyte solution can be improved.

Examples of a fluorinated ethylene carbonate having a fluorine number of 1 to 8 and a derivative thereof include monofluoroethylene carbonate, 4,4-difluoroethylene carbonate, 4,5-difluoroethylene carbonate, 4-fluoro-4-methyl ethylene carbonate, 4,5-difluoro-4-methyl ethylene carbonate, 4-fluoro-5-methyl ethylene carbonate, 4,4-difluoro-5-methyl ethylene carbonate, 4-(fluoromethyl)ethylene carbonate, 4-(difluoromethyl)ethylene carbonate, 4-(trifluoromethyl) ethylene carbonate, 4-(fluoromethyl) 4-fluoroethylene carbonate, 4-(fluoromethyl) 5-fluoroethylene carbonate, 4-fluoro-4,5-dimethyl ethylene carbonate, 4,5-difluoro-4,5-dimethyl ethylene carbonate, and 4,4-difluoro-5,5-dimethyl ethylene carbonate.

Among them, monofluoroethylene carbonate, 4,4-difluoroethylene carbonate, and 4,5-difluoroethylene carbonate are preferable, because they give high electrolytic conductivity to an electrolyte solution, and can easily form a stable interface protective film.

The fluorinated cyclic carbonates may be used singly, or in an optional combination of two or more kinds thereof at an optional ratio. The amount of a fluorinated cyclic carbonate (total amount in the case of 2 or more kinds) in an electrolyte solution as 100% by mass is preferably 0.001% by mass or more, more preferably 0.01% by mass or more, further preferably 0.1% by mass or more, still further preferably 0.5% by mass or more, particularly preferably 1% by mass or more, and most preferably 1.2% by mass or more, meanwhile is preferably 10% by mass or less, more preferably 7% by mass, further preferably 5% by mass or less, particularly preferably 3% by mass or less, and most preferably 2% by mass or less. Further, when the fluorinated cyclic carbonate is used as a nonaqueous solvent, the blending amount in a nonaqueous solvent as 100% by volume is preferably 1% by volume or more, more preferably 5% by volume or more, and further preferably 10% by volume or more, meanwhile is preferably 50% by volume or less, more preferably 35% by volume or less, and further preferably 25% by volume or less.

By using the carbonate at the aforedescribed content, it becomes possible to obtain sufficient improving effects on high temperature storage characteristics and cycle characteristics, and also to suppress unnecessary gas generation.

[1-4-3. Compound Having Isocyanate Group]

A nonaqueous electrolyte solution may contain a compound having an isocyanate group. Hereinafter, it may be sometimes referred to as "isocyanate compound".

There is no particular restriction on the isocyanate compound, insofar as it is an organic compound having at least one isocyanate group in the molecule, however the number of isocyanate groups is preferably from 1 to 4 in the molecule, more preferably from 1 to 3, and further preferably 1 or 2.

The isocyanate compound is preferably a compound in which an isocyanate group is bonded with: an straight chain or branched alkylene group, a cycloalkylene group, a structure in which a cycloalkylene group and an alkylene group are linked together, an aromatic hydrocarbon group, a structure in which an aromatic hydrocarbon group and an alkylene group are linked together, an ether structure (—O—), a structure in which an ether structure (—O—) and an alkylene group are linked together, a carbonyl group (—C(=O)—), a structure in which a carbonyl group and an alkylene group are linked together, a sulfonyl group (—S (=O)—), a structure in which a sulfonyl group and an alkylene group are linked together, or a compound having, for example, a structure where one of the above is halogenated; more preferably a compound in which an isocyanate group is bonded with: an straight chain or branched alkylene group, a cycloalkylene group, a structure in which a cycloalkylene group and an alkylene group are linked together, or an aromatic hydrocarbon group or a structure in which an aromatic hydrocarbon group and an alkylene group are linked together; and further preferably a compound in which an isocyanate group is bonded with a structure in which a cycloalkylene group and an alkylene group are linked together. There is no particular restriction on the molecular weight of the isocyanate compound. The molecular weight is preferably 80 or more, more preferably 115 or more, and further preferably 170 or more, however is 300 or less, and more preferably 230 or less. Within the range, it is easy to secure the solubility of the isocyanate compound in a nonaqueous electrolyte solution, so that the effect of the present invention is easily obtained. There is no particular restriction on a method for producing the isocyanate compound, and it can be produced by arbitrarily selecting a publicly known method. Alternatively, a commercial product may be used.

Examples of the isocyanate compound include:

as a compound having one isocyanate group, an alkyl isocyanate, such as methyl isocyanate, ethyl isocyanate, propyl isocyanate, isopropyl isocyanate, butyl isocyanate, and tert-butyl isocyanate; a cycloalkyl isocyanate, such as cyclohexyl isocyanate, and an unsaturated isocyanate, such as allyl isocyanate and propargyl isocyanate; and an aromatic isocyanate, such as phenyl isocyanate, trifluoromethylphenyl isocyanate, and p-toluenesulfonyl isocyanate;

As a compound having two isocyanate groups, a compound, such as monomethylene diisocyanate, dimethylene diisocyanate, tetramethylene diisocyanate, hexamethylene diisocyanate, octamethylene diisocyanate, decamethylene diisocyanate, 1,4-diisocyanato-2-butene, toluene diisocyanate, xylene diisocyanate, 1,3-bis(isocyanatomethyl)cyclohexane, 1,4-diisocyanatocyclohexane, dicyclohexylmethane-4,4'-diisocyanate, bicyclo[2.2.1]heptane-2,5-diylbis(methyl isocyanate), bicyclo[2.2.1]heptane-2,6-diylbis(methyl isocyanate), isophorone diisocyanate, carbonyl diisocyanate, 1,4-diisocyanatobutane-1,4-dione, and trimethylhexamethylene diisocyanate;

As a compound having three isocyanate groups, a compound, such as 1,6,11-triisocyanatoundecane, 4-isocyanatomethyl-1,8-octamethylene diisocyanate, 1,3,5-triisocyanate methylbenzene, 1,3,5-tris(6-isocyanatohexan-1-yl)-1,3,5-triazine-2,4,6(1H,3H,5H)-trione, and a trimer compound derived from a compound having at least two isocyanate groups in the molecule (e.g. biuret, an isocyanurate, an adduct and a bifunctional type modified polyisocyanate).

Among these, compounds, such as t-butyl isocyanate, cyclohexyl isocyanate, p-toluenesulfonyl isocyanate, tetramethylene diisocyanate, hexamethylene diisocyanate, decamethylene diisocyanate, 1,3-bis(isocyanatomethyl)cyclohexane, dicyclohexylmethane-4,4'-diisocyanate, bicyclo[2.2.1]heptane-2,5-diylbis(methylisocyanate), bicyclo[2.2.1]heptane-2,6-diylbis(methylisocyanate), isophorone diisocyanate, and trimethylhexamethylene diisocyanate are preferable from the viewpoint of improvement of the storage characteristics; cyclohexyl isocyanate, p-toluenesulfonyl isocyanate, hexamethylene diisocyanate, 1,3-bis(isocyanatomethyl)cyclohexane, dicyclohexylmethane-4,4'-diisocyanate, bicyclo[2.2.1]heptane-2,5-diylbis(methylisocyanate), and bicyclo[2.2.1]heptane-2,6-diylbis(methyl isocyanate), isophorone diisocyanate, and trimethylhexamethylene diisocyanate are more preferable; and cyclohexyl isocyanate, p-toluenesulfonyl isocyanate, hexamethylene diisocyanate, 1,3-bis(isocyanatomethyl)cyclohexane, dicyclohexylmethane-4,4'-diisocyanate, bicyclo[2.2.1]heptane-2,5-diylbis(methylisocyanate), and bicyclo[2.2.1]heptane-2,6-diylbis(methylisocyanate) are further preferable.

The isocyanate compounds may be used singly, or may be included in an optional combination of two or more kinds thereof at an optional ratio.

The amount of the isocyanate compound (total amount in the case of two or more kinds) in an electrolyte solution as 100% by mass may be 0.001% by mass or more, and is preferably 0.1% by mass or more, and more preferably 0.3% by mass or more, and may be 10% by mass or less, and is preferably 5% by mass or less, and more preferably 3% by mass or less. If the amount is within the above range, the output characteristics, load characteristics, low temperature characteristics, cycle characteristics, high temperature storage characteristics, and other characteristics can be easily controlled.

[1-4-4. Sulfur-Containing Organic Compound]

Although there is no particular restriction on the sulfur-containing organic compound insofar as it is an organic compound having at least one sulfur atom in the molecule, it is preferably an organic compound having an S=O group in the molecule. Examples thereof include an open-chain sulfonate, a cyclic sulfonate, an open-chain sulfate, a cyclic sulfate, an open-chain sulfite, and a cyclic sulfite. However, that corresponding to a fluorosulfonate is not regarded as a sulfur-containing organic compound described later, rather it is included in the fluorosulfonate serving as an electrolyte described later.

Among these, an open-chain sulfonate, a cyclic sulfonate, an open-chain sulfate, a cyclic sulfate, an open-chain sulfite, and a cyclic sulfite are preferable, and a compound having an $S(=O)_2$ group is more preferable.

More preferable are an open-chain sulfonate and a cyclic sulfonate, and a cyclic sulfonate is further preferable. Specific examples of compounds of an open-chain sulfonate, a cyclic sulfonate, an open-chain sulfate, a cyclic sulfate, an open-chain sulfite, and a cyclic sulfite include the following.

<Open-Chain Sulfonate>

A fluorosulfonate, such as methyl fluorosulfonate, and ethyl fluorosulfonate.

A methanesulfonate, such as methyl methanesulfonate, ethyl methanesulfonate, busulfan, methyl 2-(methanesulfonyloxy)propionate, ethyl 2-(methanesulfonyloxy)propionate, and ethyl methanesulfonyloxyacetate.

An alkenyl sulfonate, such as methyl vinyl sulfonate, ethyl vinyl sulfonate, allyl vinyl sulfonate, propargyl vinyl sulfonate, methyl allyl sulfonate, ethyl allyl sulfonate, allyl allyl sulfonate, propargyl allyl sulfonate, and 1,2-bis(vinylsulfonyloxy)ethane.

An alkyl disulfonate, such as methoxycarbonylmethyl methanedisulfonate, ethoxycarbonylmethyl methanedisulfonate, methoxycarbonylmethyl 1,2-ethanedisulfonate, ethoxycarbonylmethyl 1,2-ethanedisulfonate, methoxycarbonylmethyl 1,3-propanedisulfonate, ethoxycarbonylmethyl 1,3-propanedisulfonate, and 1-methoxycarbonylethyl 1,3-propanedisulfonate.

<Cyclic Sulfonate>

A sultone compound, such as 1,3-propane sultone, 1-fluoro-1,3-propane sultone, 2-fluoro-1,3-propane sultone, 3-fluoro-1,3-propane sultone, 1-methyl-1,3-propane sultone, 2-methyl-1,3-propane sultone, 3-methyl-1,3-propane sultone, 1-propene-1,3-sultone, 2-propene-1,3-sultone, 2-methyl-1-propene-1,3-sultone, 1,4-butane sultone, and 1,5-pentane sultone.

A disulfonate compound, such as methylene methanedisulfonate and ethylene methanedisulfonate.

A nitrogen-containing compound, such as 1,2,3-oxathiazolidine-2,2-dioxide.

A phosphorus-containing compound, such as 1,2,3-oxathiaphosphinane-2,2-dioxide.

<Open-Chain Sulfate>

A dialkyl sulfate compound, such as dimethyl sulfate, ethyl methyl sulfate, and diethyl sulfate.

<Cyclic Sulfate>

An alkylene sulfate compound, such as 1,2-ethylene sulfate, 1,2-propylene sulfate, 1,3-propylene sulfate, 1,2-butylene sulfate, 1,3-butylene sulfate, 1,4-butylene sulfate, 1,2-pentylene sulfate, 1,3-pentylene sulfate, 1,4-pentylene sulfate, and 1,5-pentylene sulfate.

<Open-Chain Sulfite>

A dialkyl sulfite compound, such as dimethyl sulfite, ethyl methyl sulfite and diethyl sulfite.

<Cyclic Sulfite>

An alkylene sulfite compounds such as 1,2-ethylene sulfite, 1,2-propylene sulfite, 1,3-propylene sulfite, 1,2-butylene sulfite, 1,3-butylene sulfite, 1,4-butylene sulfite, 1,2-pentylenesulfite, 1,3-pentylenesulfite, 1,4-pentylenesulfite, and 1,5-pentylenesulfite.

Among these, methyl 2-(methanesulfonyloxy)propionate, ethyl 2-(methanesulfonyloxy)propionate, 2-propynyl 2-(methanesulfonyloxy)propionate, 1-methoxycarbonylethyl propanedisulfonate, 1-ethoxycarbonylethyl propanedisulfonate, 1-methoxycarbonylethyl butanedisulfonate, 1-ethoxycarbonylethyl butanedisulfonate, 1,3-propane sultone, 1-propene-1,3-sultone, 1,4-butane sultone, 1,2-ethylene sulfate, 1,2-ethylene sulfite, methyl methanesulfonate, and ethyl methanesulfonate are preferable from the viewpoint of improvement of the initial efficiency; 1-methoxycarbonylethyl propanedisulfonate, 1-ethoxycarbonylethyl propanedisulfonate, 1-methoxycarbonylethyl butanedisulfonate, 1-ethoxycarbonylethyl butanedisulfonate, 1,3-propane sultone, 1-propene-1,3-sultone, 1,2-ethylene sulfate, and 1,2-ethylene sulfite are more preferable; and 1,3-propane sultone, and 1-propene-1,3-sultone are further preferable.

The sulfur-containing organic compounds may be used singly, or in an optional combination of two or more kinds thereof at an optional ratio.

The content of the sulfur-containing organic compound (total amount in the case of 2 or more kinds) in an electrolyte solution as 100% by mass may be 0.001% by mass or more, is preferably 0.01% by mass or more, more preferably 0.1% by mass or more, particularly preferably 0.3% by mass or more, and most preferably 0.6% by mass or more, and may be 10% by mass or less, is preferably 5% by mass or less, more preferably 3% by mass or less, further preferably 2% by mass or less, particularly preferably 1.5% by mass or less, and most preferably 1.0% by mass or less. If the amount is within the above range, the battery output characteristics, load characteristics, low temperature characteristics, cycle characteristics, high temperature storage characteristics, and other characteristics can be easily controlled.

[1-4-5. Phosphorus-Containing Organic Compound]

There is no particular restriction on the phosphorus-containing organic compound, insofar as it is an organic compound having at least one phosphorus atom in the molecule. A battery using a nonaqueous electrolyte solution containing a phosphorus-containing organic compound can improve its durability.

As the phosphorus-containing organic compound, a phosphate, a phosphonate, a phosphinate, and a phosphite are preferable; a phosphate, and a phosphonate are more preferable; and a phosphonate is more preferable. These esters may have a substituent.

Specific examples of the phosphorus-containing organic compound include diethyl vinyl phosphate, allyl diethyl phosphate, propargyl diethyl phosphate, trivinyl phosphate, triallyl phosphate, tripropargyl phosphate, diallylethyl phosphate, dipropargylethyl phosphate, 2-acryloyloxyethyl diethyl phosphate, tris(2-acryloyloxyethyl)phosphate, trimethyl phosphonoformate, methyl diethylphosphonoformate, methyl dipropylphosphonoformate, methyl dibutylphosphonoformate, triethyl phosphonoformate, ethyl dimethylphosphonoformate, ethyl dipropylphosphonoformate, ethyl dibutylphosphonoformate, tripropyl phosphonoformate, propyl dimethylphosphonoformate, propyl diethylphosphonoformate, propyl dibutylphosphonoformate, tributyl phosphonoformate, butyl dimethylphosphonoformate, butyl diethylphosphonoformate, butyl dipropylphosphonoformate, methyl bis(2,2,2-trifluoroethyl)phosphonoformate, ethyl bis(2,2,2-trifluoroethyl)phosphonoformate, propyl bis(2,2,2-trifluoroethyl)phosphonoformate, butyl bis(2,2,2-trifluoroethyl)phosphonoformate, trimethyl phosphonoacetate, methyl diethylphosphonoacetate, methyl dipropylphosphonoacetate, methyl dibutylphosphonoacetate, triethyl phosphonoacetate, ethyl dimethylphosphonoacetate, ethyl dipropylphosphonoacetate, ethyl dibutylphosphonoacetate, tripropyl phosphonoacetate, propyl dimethylphosphonoacetate, propyl diethylphosphonoacetate, propyl dibutylphosphonoacetate, tributyl phosphonoacetate, butyl dimethylphosphonoacetate, butyl diethylphosphonoacetate, butyl dipropylphosphonoacetate, methyl bis(2,2,2-trifluoroethyl)phosphonoacetate, ethyl bis(2,2,2-trifluoroethyl)phosphonoacetate, propyl bis(2,2,2-trifluoroethyl)phosphonoacetate, butyl bis(2,2,2-trifluoroethyl)phosphonoacetate, allyl dimethylphosphonoacetate, allyl diethylphosphonoacetate, 2-propynyl dimethylphosphonoacetate, 2-propynyl diethylphosphonoacetate, trimethyl 3-phosphonopropionate, methyl 3-(diethylphosphono)propionate, methyl 3-(dipropylphosphono)propionate, methyl 3-(dibutylphosphono)propionate, triethyl 3-phosphonopropionate, ethyl 3-(dimethylphosphono)propionate, ethyl 3-(dipropylphosphono)propionate, ethyl 3-(dibutylphosphono)propionate, tripropyl 3-phosphonopropionate, propyl 3-(dimethylphosphono)propionate, propyl 3-(diethylphosphono)propionate, propyl 3-(dibutylphosphono)propionate, tributyl 3-phosphonopropionate, butyl 3-(dimethylphosphono)propionate, butyl 3-(diethylphosphono)propionate, butyl 3-(dipropylphosphono)propionate, methyl 3-(bis(2,2,2-trifluoroethyl)phosphono)propionate, ethyl 3-(bis(2,2,2-trifluoroethyl)phosphono)propionate, propyl 3-(bis(2,2,2-trifluoroethyl)phosphono)propionate, butyl 3-(bis(2,2,2-trifluoroethyl)phosphono)propionate, trimethyl 4-phosphonobutyrate, methyl 4-(diethylphosphono)butyrate, methyl 4-(dipropylphosphono)butyrate, methyl 4-(dibutylphosphono)butyrate, triethyl 4-phosphonobutyrate, ethyl 4-(dimethylphosphono)butyrate, ethyl 4-(dipropylphosphono)butyrate, ethyl 4-(dibutylphosphono)butyrate, tripropyl 4-phosphonobutyrate, propyl 4-(dimethylphosphono)butyrate, propyl 4-(diethylphosphono)butyrate, propyl 4-(dibutylphosphono)butyrate, tributyl 4-phosphonobutyrate, butyl 4-(dimethylphosphono)butyrate, butyl 4-(diethylphosphono)butyrate, and butyl 4-(dipropylphosphono)butyrate.

The phosphorus-containing organic compounds may be used singly, or in an optional combination of two or more kinds thereof at an optional ratio.

The content of the phosphorus-containing organic compound (total amount in the case of 2 or more kinds) in an electrolyte solution as 100% by mass may be 0.001% by mass or more, is preferably 0.01% by mass or more, more preferably 0.1% by mass or more, further preferably 0.4% by mass or more, particularly preferably 0.6% by mass or more, and may be 10% by mass or less, is preferably 5% by mass or less, more preferably 3% by mass or less, further preferably 2% by mass or less, particularly preferably 1.2% by mass or less, and most preferably 0.9% by mass or less. If the amount is within the above range, the output characteristics, load characteristics, low temperature characteristics, cycle characteristics, high temperature storage characteristics, and other characteristics can be easily controlled.

[1-4-6. Organic Compound Having Cyano Group]

Examples of an organic compound having a cyano group include pentanenitrile, octanenitrile, decanenitrile, dodecanenitrile, crotononitrile, succinonitrile, glutaronitrile, adiponitrile, pimelonitrile, suberonitrile, and 3,9-bis(2-cyanoethyl)-2,4,8,10-tetraoxaspiro[5,5]undecane, 1,2,3-tricyanopropane, 1,3,5-tricyanopentane, 1,4,7-tricyanoheptane, 1,2,4-tricyanobutane, 1,2,5-tricyanopentane, 1,2,6-tricyanohexane, 1,3,6-tricyanohexane, and 1,2,7-tricyanoheptane.

The concentration of the organic compound having a cyano group in an electrolyte solution as 100% by mass may be 0.001% by mass or more, is preferably 0.01% by mass or more, more preferably 0.1% by mass or more, and particularly preferably 0.3% by mass or more; and may be 10% by mass or less, is preferably 5% by mass or less, more preferably 3% by mass or less, and particularly preferably 2% by mass or less. If the amount is within the above range, the output characteristics, load characteristics, low temperature characteristics, cycle characteristics, high temperature storage characteristics, and other characteristics can be easily controlled.

The organic compounds having a cyano group may be used singly, or in an optional combination of two or more kinds thereof at an optional ratio.

[1-4-7. Silicon-Containing Compound]

There is no particular restriction on the silicon-containing compound, insofar as it is a compound having at least one silicon atom in the molecule. By using an electrolyte solution containing the silicon-containing compound, the durability of a nonaqueous electrolyte secondary battery can be improved.

As the silicon-containing compound, a compound represented by the Formula (2-6) is preferable.

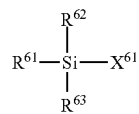

(2-6)

In Formula (2-6), $R^{61}$, $R^{62}$, and $R^{63}$ are independently a hydrogen atom, a halogen atom, or a hydrocarbon group having a carbon number of 1 to 10, $X^{61}$ is an organic group including at least one atom selected from the group consisting of an oxygen atom, a nitrogen atom, and a silicon atom.

$R^{61}$, $R^{62}$, and $R^{63}$ are preferably a hydrogen atom, a fluorine atom, a methyl group, an ethyl group, a n-propyl group, an isopropyl group, a n-butyl group, a sec-butyl group, an isobutyl group, a tert-butyl group, and a phenyl group, and more preferably a methyl group.

$X^{61}$ is an organic group including at least one atom selected from the group consisting of an oxygen atom, a nitrogen atom and a silicon atom, and preferably is an organic group including at least an oxygen atom or a silicon atom. In this regard, the organic group means a group composed of one or more atoms selected from the group consisting of a carbon atom, a hydrogen atom, a nitrogen atom, an oxygen atom, a silicon atom, a sulfur atom, a phosphorus atom, and a halogen atom. Examples of the organic group include an alkyl group, an alkenyl group, an alkynyl group, an aryl group, an alkoxy group, a CN group, an isocyanate group, a fluoro group, an alkylsulfonic acid group, and a trialkylsilyl group. Part of monovalent organic groups may be substituted with a fluorine atom. The carbon number of the organic group may be 1 or more, preferably 3 or more, and more preferably 5 or more; and 15 or less, preferably 12 or less, and more preferably 8 or less.

Among these, an alkylsulfonic acid group, a trialkylsilyl group, a boric acid group, a phosphoric acid group, and a phosphorous acid group are preferable.

Examples of a silicon-containing compound include:

a boric acid compound, such as tris(trimethylsilyl) borate, tris(trimethoxysilyl) borate, tris(triethylsilyl) borate, tris(triethoxysilyl) borate, tris(dimethylvinylsilyl) borate, and tris(diethylvinylsilyl) borate;

a phosphoric acid compound, such as tris(trimethylsilyl) phosphate, tris(triethylsilyl)phosphate, tris(tripropylsilyl) phosphate, tris(triphenylsilyl)phosphate, tris(trimethoxysilyl)phosphate, tris(triethoxysilyl)phosphate, tris(triphenoxysilyl)phosphate, tris(dimethylvinylsilyl) phosphate, and tris(diethylvinylsilyl)phosphate;

a phosphorous acid compound, such as tris(trimethylsilyl) phosphite, tris(triethylsilyl)phosphite, tris(tripropylsilyl) phosphite, tris(triphenylsilyl)phosphite, tris(trimethoxysilyl)phosphite, tris(triethoxysilyl)phosphite, tris(triphenoxysilyl)phosphite, tris(dimethylvinylsilyl) phosphite, and tris(diethylvinylsilyl)phosphite;

a sulfonic acid compound, such as trimethylsilyl methanesulfonate, and trimethylsilyl tetrafluoromethanesulfonate; and a disilane compound, such as hexamethyldisilane, hexaethyldisilane, 1,1,2,2-tetramethyldisilane, 1,1,2,2-tetraethyldisilane, 1,2-diphenyltetramethyldisilane, and 1,1,2,2-tetraphenyldisilane.

Among these, tris(trimethylsilyl) borate, tris(trimethylsilyl)phosphate, tris(trimethylsilyl)phosphite, trimethylsilyl methanesulfonate, trimethylsilyl tetrafluoromethanesulfonate, hexamethyldisilane, hexaethyldisilane, 1,2-diphenyltetramethyldisilane, and 1,1,2,2-tetraphenyldisilane are preferable; and tris(trimethylsilyl) borate, tris(trimethylsilyl) phosphate, tris(trimethylsilyl)phosphite, and hexamethyldisilane are more preferable.

The silicon-containing compounds may be used singly, or in an optional combination of two or more kinds thereof at an optional ratio.

The amount of the silicon-containing compound (total amount in the case of 2 or more types) in an electrolyte solution as 100% by mass may be 0.001% by mass or more, is preferably 0.1% by mass or more, and more preferably 0.3% by mass or more; and may be 10% by mass or less, is preferably 5% by mass or less, and more preferably 3% by mass or less. If the amount is within the range, the output characteristics, load characteristics, low temperature characteristics, cycle characteristics, high temperature storage characteristics, and other characteristics can be easily controlled.

[1-4-8. Aromatic Compound]

There is no particular restriction on the aromatic compound, insofar as it is an organic compound having at least one aromatic ring in the molecule.

Examples of the aromatic compound include the following:

Fluorobenzene, difluorobenzene, trifluorobenzene, tetrafluorobenzene, pentafluorobenzene, hexafluorobenzene, benzotrifluoride, cyclohexylbenzene, tert-butylbenzene, tert-amylbenzene, diphenyl carbonate, methylphenyl carbonate, 2-phenylethyl acetate, 3-phenylpropyl acetate, methyl phenyl acetate, ethyl phenyl acetate, 2-phenylethyl phenyl acetate, 3-phenylpropyl phenyl acetate, methyl 3-phenylpropionate, ethyl 3-phenylpropionate, 2-phenylethyl 3-phenylpropionate, 3-phenylpropyl 3-phenylpropionate, methylphenylsulfonate, 2-tert-butylphenylmethylsulfonate, 4-tert-butylphenylmethylsulfonate, cyclohexylphenylmethylsulfonate, trimethylphenylsilane, tris(2-tert-butylphenyl)phosphate, tris(4-tert-butylphenyl) phosphate, tris(2-cyclohexylphenyl)phosphate, tris(4-cyclohexylphenyl)phosphate, diethylphenylphosphonate, diethylbenzylphosphonate, diethyl-(4-fluorobenzyl)phosphonate, 2-fluorophenyl acetate, 4-fluorophenyl acetate, 2,4-difluoroanisole, 2-fluorotoluene, 3-fluorotoluene, and 4-fluorotoluene.

Among these, fluorobenzene, benzotrifluoride, cyclohexylbenzene, tert-butylbenzene, tert-amylbenzene, diphenyl carbonate, methylphenyl carbonate, 2-phenylethyl phenyl acetate, 4-tert-butylphenylmethylsulfonate, cyclohexylphenylmethylsulfonate, tris(2-tert-butylphenyl)phosphate, tris (4-tert-butylphenyl)phosphate, tris(4-cyclohexylphenyl) phosphate, 2,4-difluoroanisole, and 2-fluorotoluene.

Examples include in addition to those listed above:

1-phenyl-1,3,3-trimethyl indan, 2,3-dihydro-1,3-dimethyl-1-(2-methyl-2-phenylpropyl)-3-phenyl-1H-indan, 2,2-diphenylbutane, 3,3-diphenylpentane, 3,3-diphenylhexane, 4,4-diphenylheptane, 5,5-diphenyloctane, 6,6-diphenylnonane, 1,1-diphenyl-1,1-di-tert-butyl-methane, 1,1-diphenylcyclohexane, 1,1-diphenylcyclopentane, 1,1-diphenyl-4-methylcyclohexane, 1,3-bis(1-methyl-1-phenylethyl)-benzene, and 1,4-bis(1-methyl-1-phenylethyl)-benzene.

The aromatic compounds may be used singly, or in combination of two or more kinds thereof. The amount of the aromatic compound (total amount in the case of 2 or more types) may be 0.001% by mass or more in an entire nonaqueous electrolyte solution as 100% by mass, is preferably 0.01% by mass or more, more preferably 0.05% by mass or more, further preferably 0.1% by mass or more, and still further preferably 0.4% by mass or more; and may be 10% by mass or less, is preferably 8% by mass or less, more preferably 5% by mass or less, further preferably 3% by mass or less, and particularly preferably 2.5% by mass or less. Within the above range, the effect of the present invention can be easily expressed, and increase in the battery resistance can be prevented.

[1-4-9. Fluorine-Free Carboxylic Acid Ester]

The fluorine-free carboxylic acid ester can also be used as a solvent as described above. There is no particular restriction on the fluorine-free carboxylic acid ester, insofar as it is a carboxylic acid ester having no fluorine atom in the molecule.

Examples of a fluorine-free open-chain carboxylic acid ester include the following:

methyl acetate, ethyl acetate, n-propyl acetate, n-butyl acetate, methyl propionate, ethyl propionate, n-propyl propionate, n-butyl propionate, methyl butyrate, ethyl butyrate, n-propyl butyrate, n-butyl butyrate, methyl valerate, ethyl valerate, n-propyl valerate, n-butyl valerate, methyl pivalate, ethyl pivalate, n-propyl pivalate, and n-butyl pivalate.

Among these, methyl acetate, ethyl acetate, n-propyl acetate, n-butyl acetate, methyl propionate, ethyl propionate, n-propyl propionate, and n-butyl propionate are more preferable from the viewpoint of improving the ionic conductivity owing to reduction of the viscosity of an electrolyte solution, methyl propionate, ethyl propionate, n-propyl propionate, and n-butyl propionate are more preferable, and ethyl propionate and n-propyl propionate are particularly preferable.

The fluorine-free carboxylic acid esters may be used singly, or in an optional combination of two or more kinds thereof at an optional ratio.

The amount of the fluorine-free carboxylic acid ester (total amount in the case of 2 or more kinds) in an electrolyte solution as 100% by mass may be 0.001% by mass or more, is preferably 0.01% by mass or more, more preferably 0.1% by mass or more, further preferably 0.3% by mass or more, and particularly preferably 0.6% by mass or more, and may be 10% by mass or less, is preferably 5% by mass or less, more preferably 3% by mass or less, further preferably 2% by mass or less, and particularly preferably 1% by mass or less. Further, when the fluorine-free carboxylic acid ester is used as a nonaqueous solvent, the blending amount is preferably 1% by volume or more in a nonaqueous solvent as 100% by volume of, more preferably 5% by volume or more, further preferably 10% by volume or more, and still further preferably 20% by volume or more, and may be 50% by volume or less, is more preferably 45% by volume or less, and further preferably 40% by volume or less. Within the range, increase in the negative electrode resistance is suppressed, and the output characteristics, load characteristics, low temperature characteristics, cycle characteristics, and high temperature storage characteristics can be easily controlled.

[1-4-10. Cyclic Compound Having a Plurality of Ether Bonds]

There is no particular restriction on the cyclic compound having a plurality of ether bonds, insofar as it is a cyclic compound having a plurality of ether bonds in the molecule. The cyclic compounds having a plurality of ether bonds contribute to improvement of the high temperature storage characteristics of a battery, and is able to improve the durability of a nonaqueous electrolyte secondary battery.

Examples of the cyclic compound having a plurality of ether bonds include tetrahydrofuran, methyltetrahydrofuran, tetrahydropyran, and methyltetrahydropyran.

The cyclic compounds having a plurality of ether bonds may be used singly, or in an optional combination of two or more kinds thereof at an optional ratio. The amount of the cyclic compound having a plurality of ether bonds (total amount in the case of 2 or more types) in an electrolyte solution as 100% by mass may be 0.001% by mass or more, is preferably 0.01% by mass or more, more preferably 0.1% by mass or more, and particularly preferably 0.3% by mass or more, and may be 10% by mass or less, is preferably 5% by mass or less, more preferably 3% by mass or less, and further preferably 2% by mass or less. When the amount satisfies the above range, the output characteristics, load characteristics, low temperature characteristics, cycle characteristics, high temperature storage characteristics, and other characteristics can be easily controlled.

[1-4-11. Additive that is Electrolyte]

Among the additives, examples of an additive playing a role of electrolyte include the following (borate, oxalate, and fluorosulfonate). These salts are particularly preferably in a form of a lithium salt.

The total content of a borate, an oxalate and a fluorosulfonate in a nonaqueous electrolyte solution is preferably 0.01% by mass or more, and particularly preferably 0.1% by mass or more. Meanwhile, it is preferably 20% by mass or less, and particularly preferably 10% by mass or less.

[1-4-11-1. Borate]

There is no particular restriction on the borate, insofar as it is a salt having at least one boron atom in the molecule. However, one corresponding to an oxalate is not regarded as a borate but rather as one of the oxalates described later. The borate is able to improve the durability of a battery according to the present invention.

Examples of the counter cation of the borate include lithium, sodium, potassium, magnesium, calcium, rubidium, cesium, and barium, among which lithium is preferable.

As the borate, a lithium salt is preferable, and a fluorine-containing lithium salt can also be suitably used. Examples thereof include $LiBF_4$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$. Among them, $LiBF_4$ is more preferable from the viewpoint of an improving effect on the initial charging and discharging efficiency and high temperature cycle characteristics.

The borates may be used singly, or in an optional combination of two or more kinds thereof at an optional ratio.

The amount of the borate (total amount in the case of 2 or more kinds) may be 0.05% by mass or more, is preferably 0.1% by mass or more, more preferably 0.2% by mass or more, further preferably 0.3% by mass or more, and particularly preferably 0.4% by mass or more; and may be 10.0% by mass or less, is preferably 5.0% by mass or less, more preferably 3.0% by mass or less, further preferably 2.0% by mass or less, and particularly preferably 1.0% by mass or less. Within the range, a side reaction of the battery negative electrode is inhibited, so that increased in the resistance is suppressed.

[1-4-11-2. Oxalate]

There is no particular restriction on the oxalate, insofar as it is a compound having at least one oxalic acid structure in the molecule. It can improve the durability of a battery of the present invention.

As the oxalate, a metal salt represented by the Formula (9) is preferable. This salt is a salt having an oxalato complex as an anion.

$$M^1_a[M^2(C_2O_4)_b R_c^{91}]d \quad (9)$$

In Formula (9), $M^1$ is an element selected from the set consisting of Group 1, and Group 2 in the periodic table, and aluminum (Al), and $M^2$ is an element selected from the set consisting of transition metals, Group 13, Group 14, and Group 15 of the periodic table. $R^{91}$ is a group selected from the set consisting of a halogen, an alkyl group having a carbon number of 1 to 11, and a halogen-substituted alkyl group having a carbon number of 1 to 11; a and b are a positive integer; c is 0 or a positive integer; and d is an integer from 1 to 3.

$M^1$ is preferably lithium, sodium, potassium, magnesium, or calcium from the viewpoint of battery characteristics when an electrolyte solution containing an oxalate is used for a lithium secondary battery, and particularly preferably lithium.

As $M^2$ boron or phosphorus is particularly preferable from the viewpoint of electrochemical stability when used in a lithium secondary battery.

Examples of $R^{91}$ include fluorine, chlorine, a methyl group, a trifluoromethyl group, an ethyl group, a pentafluoroethyl group, a propyl group, an isopropyl group, a butyl group, a sec-butyl group, and a tert-butyl group, and fluorine and a fluoromethyl group are preferable.

Examples of the metal salt represented by Formula (9) include the following:

a lithium (oxalato)borate, such as lithium difluoro(oxalato)borate, and lithium bis(oxalato)borate;

a lithium (oxalato)phosphate, such as lithium tetrafluoro(oxalato)phosphate, lithium difluorobis(oxalato)phosphate, and lithium tris(oxalato)phosphate.

Among these, lithium bis(oxalato)borate and lithium difluorobis(oxalato)phosphate are preferable, and lithium bis(oxalato)borate is more preferable.

The oxalates may be used singly, or in an optional combination of two or more kinds thereof at an optional ratio.

The amount of the oxalate (total amount in the case of two or more) may be 0.001% by mass or more, is preferably 0.01% by mass or more, more preferably 0.1% by mass or more, and particularly preferably 0.3% by mass or more; and may be 10% by mass or less, is preferably 5% by mass or less, more preferably 3% by mass or less, further preferably 2% by mass or less, and particularly preferably 1% by mass or less. Within the range, the output characteristics, load characteristics, low temperature characteristics, cycle characteristics, high temperature storage characteristics, and other characteristics of a secondary battery can be easily controlled.

[1-4-11-3. Fluorosulfonate]

There is no particular restriction on the fluorosulfonate, insofar as it is a salt having at least one fluorosulfonic acid structure in the molecule. The fluorosulfonate is able to improve the durability of a battery of the present invention.

There is no particular restriction on a counter cation for the fluorosulfonate, and examples thereof include lithium, sodium, potassium, rubidium, cesium, magnesium, calcium, barium, and an ammonium represented by $NR^{131}R^{132}R^{133}R^{134}$ (wherein $R^{131}$ to $R^{134}$ independently are a hydrogen atom or an organic group having a carbon number of 1 to 12). As the counter cation, lithium, sodium, and potassium are preferable, and among them lithium is preferable.

Examples of the fluorosulfonate include lithium fluorosulfonate, sodium fluorosulfonate, potassium fluorosulfonate, rubidium fluorosulfonate, and cesium fluorosulfonate; and lithium fluorosulfonate is preferable. An imide salt having a fluorosulfonic acid structure, such as lithium bis(fluorosulfonyl)imide can also be used as the fluorosulfonate.

The fluorosulfonates may be used singly, or in an optional combination of two or more kinds thereof at an optional ratio.

The content of the fluorosulfonate (total amount in the case of two or more) may be 0.05% by mass or more, is preferably 0.1% by mass or more, more preferably 0.2% by mass or more, further preferably 0.3% by mass or more, and particularly preferably 0.4% by mass or more; and may be 10% by mass or less, is preferably 8% by mass or less, more preferably 5% by mass or less, further preferably 2% by mass or less, and particularly preferably 1% by mass or less. Within the range, a side reaction in a battery occurs little, and increase in the resistance is suppressed.

[2. Nonaqueous Electrolyte Secondary Battery]

A nonaqueous electrolyte secondary battery of an embodiment of the present invention is a nonaqueous electrolyte secondary battery provided with a positive electrode with a positive electrode active material capable of absorbing and releasing a metal ion, and a negative electrode with a negative electrode active material capable of absorbing and releasing a metal ion; and includes a nonaqueous electrolyte solution;

[2-1. Nonaqueous Electrolyte Solution]

The aforedescribed nonaqueous electrolyte solution is used as a nonaqueous electrolyte solution. It is also possible that the above nonaqueous electrolyte solution is mixed with another nonaqueous electrolyte solution without departing from the gist of the present invention.

[2-2. Negative Electrode]

A negative electrode active material to be used in the negative electrode will be described below. There is no particular restriction on the negative electrode active material, insofar as it is capable of electrochemically absorbing and releasing a metal ion such as a lithium ion. Specific examples thereof include a carbonaceous material, an alloy-based material, and a lithium-containing metal composite oxide material. These may be used singly, or in an optional combination of two or more kinds thereof.

<Negative Electrode Active Material>

Examples of the negative electrode active material include a carbonaceous material, an alloy-based material, and a lithium-containing metal composite oxide material.

Examples of the carbonaceous material include (1) natural graphite, (2) artificial graphite, (3) amorphous carbon, (4) carbon coated graphite, (5) graphite coated graphite, and (6) resin coated graphite.

(1) Examples of natural graphite include scaly graphite, flaky graphite, earthy graphite and/or graphite particles obtained by a treatment, such as spheronization, or densification, on the aforedescribed graphite as the source material. Among these, spherical or ellipsoidal graphite undergone a spheronization treatment is particularly preferable from the viewpoints of packing property and charge and discharge rate characteristics of the particles.

(2) Examples of artificial graphite include those prepared by graphitization of an organic compound, such as coal tar pitch, coal-derived heavy oil, atmospheric residue oil, petroleum heavy oil, an aromatic hydrocarbon, a nitrogen-containing cyclic compound, a sulfur-containing cyclic compound, polyphenylene, poly(vinyl chloride), poly(vinyl alcohol), polyacrylonitrile, poly(vinyl butyral), a natural polymer, poly(phenylene sulfide), poly(phenylene oxide), a furfuryl alcohol resin, a phenol-formaldehyde resin, and an imide resin, at a temperatures in a range of from usually 2500° C. to usually 3200° C., and if necessary further performing pulverization and/or classification. At this time, a silicon-containing compound, a boron-containing compound, or the like can be used as a graphitization catalyst. Also, artificial graphite obtained by graphitization of mesocarbon microbeads separated in a process of a heat treatment of pitch may be included. In addition, artificial graphite of granulated particles composed of primary particles is also included. For example, artificial graphite particles are prepared by preparing flat particles by blending a carbonaceous material powder capable of graphitization, such as mesocarbon microbeads, and coke, with a binder capable of graphitization, such as tar, and pitch, as well as a graphitization catalyst, and graphitizing the blend, followed by if necessary pulverization, and aggregating or binding a plurality of flat particles such that orientation planes become non-parallel.

(3) Examples of the amorphous carbon include amorphous carbon particles obtained by using an easily graphitizable carbon precursor such as tar, and pitch, for the raw material, and heat-treating the same at least once in a temperature range where graphitization does not occur (range of 400 to 2200° C.), and amorphous carbon particles obtained by using a non-graphitizable carbon precursor such as resin for the raw material, and heat-treating the same.

(4) Examples of the carbon coated graphite include a carbon graphite composite in which amorphous carbon has coated core graphite that is natural graphite and/or artificial graphite prepared by blending natural graphite and/or artificial graphite with a carbon precursor that is an organic compound such as tar, pitch, and resin, and heat-treating the blend at least once in a range of 400 to 2300° C. The composite may take a form where the entire surface or a part thereof is coated, or a form where a plurality of primary particles are combined using carbon originating from the aforedescribed carbon precursor as a binder. Also a carbon graphite composite may be obtained by reacting natural graphite and/or artificial graphite with a hydrocarbon gas such as benzene, toluene, methane, propane, and aromatic volatiles at a high temperature to deposit carbon on a graphite surface (CVD).

(5) Examples of the graphite coated graphite include graphite coated graphite in which a graphitized product has coated all of part of the surface of core graphite that is natural graphite and/or artificial graphite prepared by blending natural graphite and/or artificial graphite with a carbon precursor that is an easily graphitizable organic compound such as tar, pitch, and resin, and heat-treating the blend at least once in a range of about 2400 to 3200° C.

(6) Examples of the resin coated graphite include resin coated graphite in which a resin, or the like has coated core graphite that is natural graphite and/or artificial graphite prepared by blending natural graphite and/or artificial graphite with a resin or the like, and drying the blend at a temperature below 400° C.

The above carbonaceous materials (1) to (6) may be used singly, or in an optional combination of two or more kinds thereof at an optional ratio.

There is no particular restriction on an alloy-based material to be used as a negative electrode active material, insofar as it can occlude and release lithium, and it may be elementary lithium, an elementary metal composing a lithium alloy, or an alloy; or any compound among an oxide, a carbide, a nitride, a silicide, a sulfide, or a phosphide of the foregoing. As an elementary metal composing a lithium alloy, or an alloy, a material containing a metal or metalloid element of group 13 or group 14 (that is, carbon is excluded) is preferable, and an elementary metal of aluminum, silicon, or tin, and an alloy or a compound containing these atoms are more preferable. These may be used singly, or in an optional combination of two or more kinds thereof at an optional ratio.

<Physical Properties of Carbonaceous Material>

When a carbonaceous material is used as a negative electrode active material, it should preferably have the following physical properties.

(X-Ray Parameters)

The d value (interlayer distance) of the lattice plane (002) of a carbonaceous material determined by X-ray diffraction according to the method of The Japan Society for the Promotion of Science is usually 0.335 nm or more; and is usually 0.360 nm or less, preferably 0.350 nm or less, and more preferably 0.345 nm or less. The crystallite size (Lc) of the carbonaceous material determined by X-ray diffraction according to the method of The Japan Society for the Promotion of Science is preferably 1.0 nm or more, and particularly preferably 1.5 nm or more.

(Volume-Based Average Particle Size)

The volume-based average particle size of a carbonaceous material is an average particle size (median diameter) based on volume obtained by a laser diffraction/scattering method, and it is usually 1 μm or more, preferably 3 μm or more, more preferably 5 μm or more, and particularly preferably 7 μm or more. Meanwhile, it is usually 100 μm or less, preferably 50 μm or less, more preferably 40 μm or less, further preferably 30 μm or less, and particularly preferably 25 μm or less.

When the volume-based average particle size is below the above range, the irreversible capacity may increase to incur sometime a loss of the initial battery capacity. Meanwhile, when the same exceeds the above range, non-uniform coated surface tends to be formed at the time of preparation of an electrode by coating, which may be undesirable in the battery manufacturing process.

(BET Specific Surface Area)

The BET specific surface area of a carbonaceous material is a specific surface area value measured using the BET method, and is usually 0.1 m$^2 \cdot$g$^{-1}$ or more, preferably 0.7 m$^2 \cdot$g$^{-1}$ or more, more preferably 1.0 m$^2 \cdot$g$^{-1}$ or more, and particularly preferably 1.5 m$^2 \cdot$g$^{-1}$ or more. Meanwhile, it is usually 100 m$^2$ g$^{-1}$ or less, preferably 25 m$^2$ g$^{-1}$ or less, more preferably 15 m$^2$ g$^{-1}$ or less, and particularly preferably 10 m$^2$ g$^{-1}$ or less.

If the BET specific surface area value is below the range, the acceptability of lithium at the time of charging is likely to deteriorate when used as a negative electrode material, and lithium tends to precipitate on the surface of an electrode to reduce the stability. On the other hand, if it exceeds the range, when used as a negative electrode material, the reactivity with a nonaqueous electrolyte solution increases, which tends to increase gas generation and make it difficult to obtain a preferable battery.

<Constitution and Production Method of Negative Electrode>

An electrode may be produced by any publicly known method to the extent that the effect of the present invention is not significantly impaired. For example, to the negative electrode active material, a binder, a solvent, and if necessary, also a thickener, a conductive material, a filler, and other constituents are added to form a slurry, which is coated on a collector, dried, and then pressed to form an electrode.

When an alloy-based material is used, a method of forming a thin film layer containing the negative electrode active material (negative electrode active material layer) by a technique, such as vapor deposition, sputtering, or plating, may be also applied.

(Electrode Density)

Although there is no particular restriction on the structure of an electrode when the negative electrode active material is formed to an electrode, the density of the negative electrode active material present on a collector is preferably 1 g cm$^{-3}$ or more, more preferably 1.2 g cm$^{-3}$ or more, and particularly preferably 1.3 g cm$^{-3}$ or more. Meanwhile, it is preferably 2.2 g cm$^{-3}$ or less, more preferably 2.1 g cm$^3$ or less, further preferably 2.0 g cm$^3$ or less, and particularly preferably 1.9 g cm$^3$ or less.

When the density of the negative electrode active material present on the collector exceeds the above range, the negative electrode active material particles may be destructed to cause increase in the initial irreversible capacity, or deterioration of the charge and discharge characteristics at a high current density due to decrease in permeability of a non-aqueous electrolyte solution into the vicinity of the interface between the collector and the negative electrode active material. Meanwhile, when the density falls below the range, the conductivity within the negative electrode active material is decreased to increase the battery resistance, which may reduce the capacity per unit volume.

[2-3. Positive Electrode]

<Positive Electrode Active Material>

In an embodiment of the present invention, a positive electrode active material used for a positive electrode contains a lithium transition metal compound, and the positive electrode active material contains at least Ni, Mn, and Co, wherein a molar ratio of Mn/(Ni+Mn+Co) is larger than 0 and not larger than 0.32, and a molar ratio of Ni/(Ni+Mn+Co) is 0.45 or more. The lithium transition metal compound will be described below.

<Lithium Transition Metal Compound>

The lithium transition metal compound is a compound having a structure capable of desorbing and absorbing Li ions, and for example the lithium transition metal compound represented by the following Formula (I) may be used in the present invention. Further, that belonging to a layered structure enabling lithium ions to diffuse two-dimensionally is preferable. Here, the layered structure will be described in more detail. As for a typical crystal system having a layered structure, there are LiCoO$_2$ and LiNiO$_2$, belonging to the α-NaFeO$_2$ type, which is a hexagonal system belonging to the following space group in terms of symmetry:

$$R\overline{3}m$$

(hereinafter sometimes denoted as "layered R(−3)m structure").

However, the layered LiMeO$_2$ is not limited to the layered R(−3)m structure. Besides this, LiMnO$_2$ which is so-called layered Mn is a layered compound belonging to an orthorhombic system with the space group Pm2m, and Li$_2$MnO$_3$ which is so-called 213 phase may be also denoted as Li[Li$_{1/3}$Mn$_{2/3}$]O$_2$, and is belonging to a monoclinic system with the space group C$_2$/m structure, is also a layered compound in which a Li layer, a Li[Li$_{1/3}$Mn$_{2/3}$] layer, and an oxygen layer are stacked.

The lithium transition metal compound preferably contains a lithium transition metal compound represented by the following compositional formula (I), and more preferably is a lithium transition metal compound represented by the following compositional formula (I).

$$Li_{1+x}MO_2 \qquad (I)$$

In Formula (I), x is usually from −0.20 to 0.50. Particularly, the lower limit value of x is preferably −0.05 or more, more preferably −0.03 or more, especially preferably −0.02 or more, and most preferably −0.01 or more. Meanwhile, the upper limit of x may be 0.1 or less, is preferably 0.06 or less, more preferably 0.028 or less, further preferably 0.020 or less, especially preferably 0.010 or less, and most preferably 0.005 or less. It is preferable that x is within the above range, because the suppression effect on gas generation can be sufficiently exhibited to develop an adequate charge/discharge capacity by combination of a monofluorophosphate and/or a difluorophosphate contained in an electrolyte solution.

Furthermore, in Formula (I), M is composed of at least Ni, Mn, and Co, and the molar ratio of Mn/(Ni+Mn+Co) is larger than 0 and not larger than 0.32.

The lower limit of the molar ratio of Mn/(Ni+Mn+Co) is preferably 0.05 or more, more preferably 0.08 or more, further preferably 0.10 or more, particularly preferably 0.12 or more, and most preferably 0.14 or more. The upper limit of the molar ratio of Mn/(Ni+Mn+Co) is preferably 0.28 or less, more preferably 0.26 or less, further preferably 0.25 or less, particularly preferably 0.24 or less, and most preferably 0.23 or less.

When the molar ratio of Mn/(Ni+Mn+Co) is within the above range, the portion of Mn that does not participate in charge and discharge is sufficiently small, and the battery can have a high capacity, which is preferable.

Furthermore, the lower limit of the molar ratio of Ni/(Ni+Mn+Co) is 0.45 or more, preferably 0.50 or more, and more preferably 0.55 or more. The upper limit of the molar ratio of Ni/(Ni+Mn+Co) is usually 0.95 or less, may be 0.85 or less, is preferably 0.80 or less, more preferably 0.75 or less, further preferably 0.70 or less, particularly preferably 0.68 or less, and most preferably 0.64 or less.

When the molar ratio of Ni/(Ni+Mn+Co) is within the above range, the portion of Ni involved in charge and discharge is sufficiently high, and the battery can have a high capacity, which is preferable.

Furthermore, although there is no particular restriction on the lower limit of the molar ratio of Co/(Ni+Mn+Co), it is preferably 0.05 or more, more preferably 0.08 or more, further preferably 0.10 or more, and particularly preferably 0.15 or more. The upper limit of the molar ratio of Co/(Ni+Mn+Co) is also not particularly limited, but it is preferably 0.33 or less, more preferably 0.30 or less, further preferably 0.28 or less, particularly preferably 0.26 or less, and most preferably 0.24 or less.

It is preferable that the molar ratio of Co/(Ni+Mn+Co) is in the above range because the charge/discharge capacity becomes large.

In the compositional formula (I), although the atomic ratio of the oxygen amount is described as 2 for convenience, there may be some non-stoichiometry. Meanwhile, x in the above Formula (I) is the composition of a supply in the manufacture stage of a lithium transition metal compound. Usually, batteries on the market have been aged after they are assembled to batteries. Therefore, due to charge and discharge, the Li amount in the positive electrode may be deficient.

Also, a hetero element may be introduced into a lithium transition metal compound. The hetero element is one or more kinds selected from B, Na, Mg, Al, K, Ca, Ti, V, Cr, Fe, Cu, Zn, Sr, Y, Zr, Nb, Ru, Rh, Pd, Ag, In, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, S, Cl, Br, I, As, Ge, P, Pb, Sb, Si, and Sn. Among them, at least one element selected from the group consisting of Fe, Cu, W, Mo, Nb, V, Ta, Mg, Al, Ti, Zr, Zn, Ca, Be, B, Bi, Li, Na, and K is preferable.

The hetero element may be introduced into the crystal structure of a lithium transition metal compound, or not introduced into the crystal structure of a lithium transition metal compound, but rather localized on the particle surface or crystal grain boundary as a simple substance or a compound.

(Physical Properties of Positive Electrode Active Material Containing Lithium Transition Metal Compound, or Lithium Transition Metal Compound)

(1) Sulfate Salt

A positive electrode active material may contain a sulfate salt. Although there is no particular restriction on the content of a sulfate salt to be contained in a positive electrode active material, it is preferably 15 μmol/g or more from the viewpoint of exhibition of the suppression effect on gas generation by a monofluorophosphate and/or a difluorophosphate.

Further, it is more preferably 20 μmol/g or more, further preferably 25 μmol/g or more, particularly preferably 32 μmol/g or more, and most preferably 35 μmol/g or more. Further, the upper limit is preferably 100 μmol/g or less, more preferably 80 μmol/g or less, further preferably 60 μmol/g or less, particularly preferably 50 μmol/g or less, and most preferably 30 μmol/g or less, because gas generation is increased due to a side reaction.

The sulfate salt content in a positive electrode active material can be measured, for example, by water extraction ion chromatography.

(2) Average Valence of Ni

Although there is no particular restriction on the average valence of Ni of the lithium transition metal compound contained in a positive electrode active material in an uncharged state, it is preferably 2.1 or more because the Ni portion can be increased so that the battery can have high capacity. Further, it is more preferably 2.3 or more, further preferably 2.5 or more, particularly preferably 2.55 or more, and most preferably 2.6 or more. Meanwhile, the upper limit is preferably 3 or less, more preferably 2.9 or less, particularly preferably 2.8 or less, and most preferably 2.7 or less, otherwise the structural stability of the active material is lowered.

Here, the Ni valence in the present invention will be described in detail.

First, when the compositional formula of the lithium transition metal compound is rewritten to the following compositional formula (I'), M' is composed of Li, Ni, and Mn, or Li, Ni, Mn, and Co.

$$\text{LiM'O}_2 \tag{I'}$$

Although the atomic ratio with respect to the oxygen amount is described in the above Formula (I') as 2 for convenience, but there may be some non-stoichiometry. When there is non-stoichiometry, the atomic ratio of oxygen is usually in a range of 2±0.2, preferably in a range of 2±0.15, more preferably in a range of 2±0.12, further preferably in a range of 2±0.10, and particularly preferably in a range of 2±0.05.

Furthermore, it is particularly preferable that a lithium transition metal compound has an atomic composition represented by the following Formula (II) in the site of M' in Formula (I').

$$M' = \text{Li}_{z/(2+z)}[(\text{Ni}_{(1+y)/2}\text{Mn}_{(1-y/2)})_{1-x}\text{Co}_x]_{2/(2+z)} \tag{II}$$

Here, the chemical meaning of the Li composition (z and x) in a lithium nickel manganese cobalt composite oxide, which is a preferred composition of a lithium transition metal compound, will be described in more detail below.

As described above, the layered structure is not necessarily limited to the R(−3)m structure, but it is preferable from the viewpoint of electrochemical performance that the layered structure is attributable to the R(−3)m structure.

In order to find x, y, and z in the compositional formula of a lithium transition metal compound, x, y, and z are obtained by a calculation based on the Li/Ni/Mn/Co ratio of the lithium transition metal compound to be determined by analyzing each transition metal and Li by an inductively coupled plasma atomic emission spectrophotometer (ICP-AES), and by analyzing Li in the surface impurities by water extraction ion chromatography.

From a structural viewpoint, it is considered that Li related to z is introduced in the same transition metal site by substitution. In this case, by Li related to z, the average valence of Ni becomes larger than 2 (trivalent Ni is formed) by the principle of charge neutrality.

Since z increases the Ni average valence, it can be an index of Ni valence (the proportion of Ni (III)).

From the above compositional formula, when calculating a Ni valence (m) along with changes in z and z' assuming that the Co valence is 3 and the Mn valence is 4, it comes to:

$$m = 2\left[2 - \frac{1-x-z}{(1-x)(1+y)}\right]$$

This calculation result means that the Ni valence is not determined only by z, but is a function of x and y. If z=0 and y=0, the Ni valence remains 2 regardless of the value of x. If z is negative, it means that the amount of Li contained in the active material is less than the stoichiometric amount, and in the case of a very large negative value, there is a possibility that the effect of the present invention cannot be obtained. Meanwhile, even if the z value is the same, the Ni valence becomes high in the case of a Ni-rich (large y value), and/or a Co-rich (large×value) composition, and when used in a battery, the rate characteristics and output characteristics increase, but on the other hand, the capacity tends to decrease. From this, it can be said that it is more preferable to define the upper limit and the lower limit of the z value as a function of x and y.

Further, when the x value is 0≤x≤0.1, and the amount of Co is in a small range, the cost is reduced, and in addition the charge/discharge capacity, cycle characteristics, and safety are improved, when used in a lithium secondary battery which is designed such that charging is carried out at a high charging potential.

(3) pH

Although there is no particular restriction on the pH of an aqueous solution of a lithium transition metal compound, it is preferably 11 or more on the basis of the liquid temperature of 25° C., because the effect of suppressing gas generation by the combination of a monofluorophosphate and/or a difluorophosphate contained in an electrolyte solution tends to be sufficiently exhibited. Further, the pH is more preferably 11.2 or more on the basis of the liquid temperature of 25° C., more preferably 11.4 or more, particularly preferably 11.6 or more, and most preferably 11.8 or more. Further, the upper limit is preferably 13 or less on the basis of the liquid temperature of 25° C., more preferably 12.7 or less, particularly preferably 12.4 or less, and most preferably 12 or less, because gas generation due to a side reaction is reduced.

As a method for measuring the pH of the above lithium transition metal compound, 50 g of demineralized water is weighed into a beaker, and 5 g of a sample is added with stirring, while monitoring the liquid temperature and pH value, and the values of the pH and liquid temperature measured after 10 min from the addition are used.

(4) Carbonate Salt

A positive electrode active material may contain a carbonate salt. Although there is no particular restriction on the content of a carbonate salt that can be contained in a positive electrode active material, it is preferably 10 µmol/g or more, because the effect of suppressing gas generation by the combination of a monofluorophosphate and/or a difluorophosphate contained in an electrolyte solution tends to be sufficiently exhibited. The content is more preferably 20 µmol/g or more, further preferably 40 µmol/g or more, particularly preferably 60 µmol/g or more, and most preferably 80 µmol/g or more. Further, the upper limit is preferably 100 µmol/g or less, more preferably 98 µmol/g or less, particularly preferably 96 µmol/g or less, and most preferably 94 µmol/g or less, because gas generation due to a side reaction is reduced.

The amount of a carbonate salt contained in the lithium transition metal compound can be measured, for example, by water extraction ion chromatography.

(5) Tap Density

A lithium transition metal compound composing a positive electrode active material is usually a powder, and its tap density is not particularly restricted, however it is preferably 1.8 g/cm$^3$ or more because, when assemble to a battery, the charge/discharge capacity becomes high. It is more preferably 2 g/cm$^3$ or more, further preferably 2.1 g/cm$^3$ or more, particularly preferably 2.2 g/cm$^3$ or more, and most preferably 2.3 g/cm$^3$ or more. Meanwhile, the upper limit is preferably 4.0 g/cm$^3$ or less, more preferably 3.8 g/cm$^3$ or less, particularly preferably 3.6 g/cm$^3$ or less, and most preferably 3.4 g/cm$^3$ or less, because the output characteristics can be sufficient.

When a lithium transition metal compound having a high tap density is used, a positive electrode with a high density can be formed. When the tap density of a lithium transition metal compound is within the above range, the amount of a dispersion medium necessary in forming a positive electrode becomes reasonable, and therefore the amounts of a conductive material and a binder become also reasonable, so that the filling rate of the positive electrode with a lithium transition metal compound is not restricted, and the influence on the battery capacity is also reduced.

For measuring of the tap density of a lithium transition metal compound, a sample is made to pass a sieve with a mesh opening of 300 µm and to drop into a 20 cm$^3$ tapping cell to fill its volume, and tapped 200 times with a stroke length of 10 mm using a powder density analyzer (for example, Tap Denser manufactured by Seishin Enterprise Co., Ltd.), and the density may be calculated from the then volume and the sample mass.

Alternatively, for simplicity, the sample is dropped in a 10 mL graduated cylinder to fill its volume, followed by tapping 200 times, and the density may be calculated from the then volume and the sample mass.

(6) Surface Coating

The above lithium transition metal compound, on which surface a substance having a composition different from that of the substance mainly composing the lithium transition metal compound (hereinafter referred to at pleasure as "surface adhering substance") is adhered, may also be used. Examples of the surface adhering substance include oxides, such as aluminum oxide, silicon oxide, titanium oxide, zirconium oxide, magnesium oxide, calcium oxide, boron oxide, antimony oxide, and bismuth oxide; sulfate salts, such as lithium sulfate, sodium sulfate, potassium sulfate, magnesium sulfate, calcium sulfate, and aluminum sulfate; carbonate salts, such as lithium carbonate, calcium carbonate, and magnesium carbonate; and carbon.

These surface adhering substances can be made to adhere to the surface of a lithium transition metal compound, for example, by a method in which they are dissolved or suspended in a solvent, and a lithium transition metal compound is impregnated therewith and then dried; a method in which a precursor of a surface adhering substance is dissolved or suspended in a solvent, and a lithium transition metal compound is impregnated therewith followed by reaction by heating or other means; or a method in which the same is added to a precursor of a lithium transition metal compound, and both are fired at the same time. When carbon is adhered, a method in which a carbonaceous substance is stuck mechanically, for example, in the form of activated carbon afterward, may be also applied.

The mass of a surface adhering substance adhered to the surface of a lithium transition metal compound is preferably 0.1 ppm or more with respect to the mass of the lithium transition metal compound, more preferably 1 ppm or more, and further preferably 10 ppm or more. Meanwhile, it is preferably 20% or less, more preferably 10% or less, and further preferably 5% or less.

An oxidation reaction of a nonaqueous electrolyte solution on the surface of a lithium transition metal compound can be suppressed by the surface adhering substance, so that the battery life can be prolonged. Further, when the adhered amount is within the above range, the effect can be sufficiently exhibited, and incoming and outgoing of lithium ions are not impeded, and the resistance is suppressed from increasing.

(7) Shape

As for the shape of a lithium transition metal compound, a conventional shape, such as massive, polyhedral, spherical, ellipsoidal, tabular, acicular, or columnar, may be used. Further, primary particles may be aggregated to form secondary particles, and the shape of which may be spherical or ellipsoidal.

(8) Median Diameter d50

The median diameter d50 (of the secondary particle size, when primary particles are aggregated to form secondary particles) of a lithium transition metal compound can be measured using a laser diffraction/scattering particle size distribution analyzer.

The median diameter d50 is preferably 0.1 μm or more, more preferably 0.5 μm or more, further preferably 1 μm or more, and particularly preferably 3 μm or more, while it is preferably 30 μm or less, more preferably 20 μm or less, further preferably 16 μm or less, and particularly preferably 15 μm or less. When the median diameter d50 is within the above range, it is easy to obtain a high bulk density product, and further it does not take time for lithium to diffuse in a particle, so that the battery characteristics are not easily deteriorated. In addition, at the time of production of the positive electrode of a battery, that is, when an active material together with a conductive material, a binder, or the like is slurried using a solvent and applied into a thin film, streaking are less likely to occur.

In this regard, by mixing two or more kinds of lithium transition metal compounds having different median diameters d50 at an optional ratio, the packing property at the time of preparing a positive electrode can also be improved.

A measurement of the median diameter d50 of a lithium transition metal compounds is carried out using a 0.1% by mass sodium hexametaphosphate aqueous solution as a dispersion medium with a particle size distribution meter (for example LA-920, manufactured by Horiba, Ltd. Co., Ltd.) after ultrasonic dispersion of the dispersion of lithium transition metal compound for 5 min and setting a measurement refractive index at 1.24.

(9) Average Primary Particle Size

When primary particles are aggregated to form secondary particles, the average primary particle size of a lithium transition metal compound is preferably 0.01 μm or more, more preferably 0.05 μm or more, further preferably 0.08 μm or more, and particularly preferably 0.1 μm or more, meanwhile is preferably 3 μm or less, more preferably 2 μm or less, further preferably 1 μm or less, and particularly preferably 0.6 μm or less. Within the above range, it is easy to form spherical secondary particles, so that the powder packing property becomes appropriate, while sufficiently securing a specific surface area, and therefore deterioration of the battery performance such as output characteristics can be suppressed.

The average primary particle size of a lithium transition metal compound is measured by observation using a scanning electron microscope (SEM). Specifically, it can be obtained by measuring the largest segment length of a lateral line defined by opposing boundary lines of a primary particle with respect to optional 50 primary particles in a photograph at a magnification of 10000×, and taking the average value.

(10) BET Specific Surface Area

As for the BET specific surface area of a lithium transition metal compound, the specific surface area measured by a BET method is preferably 0.2 $m^2 \cdot g^{-1}$ or more, more preferably 0.3 $m^2 \cdot g^{-1}$ or more, and further preferably 0.4 $m^2 \cdot g^{-1}$ or more, meanwhile, it is preferably 4.0 $m^2 \cdot g^{-1}$ or less, more preferably 2.5 $m^2 \cdot g^{-1}$ or less, and further preferably 1.5 $m^2 \cdot g^{-1}$ or less. When the value of the BET specific surface area is within the above range, it is easy to prevent decrease in battery performance. Furthermore, sufficient tap density can be secured, so that the coating property at the time of forming a positive electrode is improved.

The BET specific surface area of a lithium transition metal compound is measured using a surface area meter (for example, the fully automatic surface area measuring instrument manufactured by Ohkura Riken Co. Ltd.). Specifically, after preliminary drying in which a sample is dried in a nitrogen stream at 150° C. for 30 min, the specific surface area is measured by a nitrogen adsorption BET one-point method according to a flowing gas method using a nitrogen and helium mixed gas accurately regulated at a nitrogen relative pressure of 0.3 with respect to the atmospheric pressure. The specific surface area obtained by this measurement is defined as the BET specific surface area of a lithium transition metal compound in the present invention.

(Method for Producing Positive Electrode Active Material Containing Lithium Transition Metal Compound)

There is no particular restriction on the method for producing a positive electrode active material containing a lithium transition metal compound, insofar as it does not exceed the gist of the present invention, and a common method as a production method for an inorganic compound may be used among many methods.

Although various methods are conceivable for preparing a positive electrode active material having a spherical or ellipsoidal form, there is for example a method, in which a transition metal source material, such as a nitrate salt, or a sulfate salt of a transition metal, and if necessary a source material with another element are dissolved, or disintegrated and dispersed in a solvent such as water, and the pH thereof is adjusted with stirring to yield and collect a spherical precursor. This product is dried as necessary, and fired at a high temperature after adding a Li source, such as LiGH, $Li_2CO_3$, and $LiNO_3$ to yield a positive electrode active material.

Examples of other method include a method in which a transition metal source material such as a nitrate salt, a sulfate salt, a hydroxide, and an oxide of a transition metal and if necessary a source material with another element are dissolved, or disintegrated and dispersed in a solvent such as water, and dried and shaped by a spray dryer, or the like into a spherical or ellipsoidal precursor, and a Li source, such as LiGH, $Li_2CO_3$, and $LiNO_3$ is added thereto and the mixture is fired at a high temperature to yield a positive electrode active material.

Examples of other method include a method in which a transition metal source material such as a nitrate salt, a sulfate salt, a hydroxide, and an oxide of a transition metal, a Li source, such as LiGH, $Li_2CO_3$, and $LiNO_3$, and if necessary a source material with another element are dissolved, or disintegrated and dispersed in a solvent such as water, and dried and shaped by a spray dryer, or the like into a spherical or ellipsoidal precursor, which is then fired at a high temperature to yield a positive electrode active material.

Meanwhile, the sulfate salt content or the carbonate salt content in the aforedescribed positive electrode active material may be regulated to a desired value by adjusting the amounts of a sulfate salt and a carbonate salt used in selecting a transition metal source material, or the firing temperature, or by performing washing or not.

A lithium transition metal compound used for positive electrode active material may be used singly or in a blend of two or more kinds. Further, it may be blended with a sulfide, or a phosphate compound, another lithium transition metal composite oxide, or the like. Examples of a sulfide include compounds having a two-dimensional layered structure, such as $TiS_2$ and $MoS_2$, and compounds represented by the general formula $Me_xMo_6S_8$ (Me is various transition metals, such as Pb, Ag, and Cu). Examples of a phosphate compound include those belonging to the olivine structure, and are generally represented by $LiMePO_4$ (Me is at least one transition metal), and specific examples thereof include $LiFePO_4$, $LiCoPO_4$, $LiNiPO_4$, and $LiMnPO_4$. Examples of the lithium transition metal composite oxide include those belonging to a spinel structure allowing three-dimensional diffusion, and a layered structure allowing two-dimensional diffusion of lithium ions. Those having a spinel structure are generally expressed as $LiMe_2O_4$ (Me is at least one transition metal), and specific examples thereof include $LiMn_2O_4$, $LiCoMnO_4$, $LiNi_{0.5}Mn_{1.5}O_4$, and $LiCoVO_4$. Specific examples of those having a layered structure include $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$, and $LiMnO_2$.

<Constitution and Production Method of Positive Electrode for Lithium Secondary Battery>

The positive electrode for a lithium secondary battery is so constructed that a layer of a positive electrode active material containing a binder and a positive electrode active material containing the aforedescribed lithium transition metal compound is formed on a collector.

A layer of a positive electrode active material is produced by blending a positive electrode active material containing a lithium transition metal compound, with a binder, if necessary together with a conductive material, a thickener, or the like, in a dry state and formed into a sheet form, and press-bonding it to a positive electrode collector; or by dissolving or dispersing these source materials in a liquid medium to form a slurry, and coating it to a positive electrode collector, and followed by drying.

As the material for a positive electrode collector, usually a metal material, such as aluminum, stainless steel, nickel plating, titanium, and tantalum, or a carbon material, such as carbon cloth and carbon paper is used. Examples of the form thereof include, in the case of the metal material, a metal foil, a metal cylinder, a metal coil, a metal sheet, a metal thin film, an expanded metal, a punched metal, and a metal foam; and in the case of the carbon material, a carbon sheet, a carbon thin film, and a carbon cylinder.

In this regard, a thin film may be appropriately formed into a mesh form.

Although there is no particular restriction on a binder to be used in the production of a layer of a positive electrode active material insofar as it is a stable material with respect to a liquid medium to be used at the time of production of an electrode in the case of a coating method, specific examples thereof include a resin type polymer, such as polyethylene, polypropylene, poly(ethylene terephthalate), poly(methyl methacrylate), an aromatic polyamide, cellulose, and nitrocellulose; a rubber type polymer, such as SBR (styrene/butadiene rubber), NBR (acrylonitrile/butadiene rubber), fluorocarbon rubber, isoprene rubber, butadiene rubber, and ethylene/propylene rubber; a thermoplastic elastomer polymer, such as a styrene/butadiene/styrene block copolymer and its hydrogenated product, EPDM (ethylene/propylene/diene terpolymer polymer), a styrene/ethylene/butadiene/ethylene copolymer, and a styrene/isoprene/styrene block copolymer and its hydrogenated product; a soft resin type polymer, such as syndiotactic 1,2-polybutadiene, poly(vinyl acetate), an ethylene/vinyl acetate copolymer, and a propylene/α-olefin copolymer; a fluorocarbon resin, such as poly(vinylidene fluoride), polytetrafluoroethylene, fluorinated poly(vinylidene fluoride), a tetrafluoroethylene/ethylene copolymer; and a polymer composition having the ion conductivity of alkali metal ions (especially lithium ions).

These substances may be used singly, or in an optional combination of two or more kinds thereof at an optional ratio.

The content of a binder in a positive electrode active material layer is usually 0.1% by mass or more, and 80% by mass or less. When the content of the binder is too low, a lithium transition metal compound cannot be sufficiently retained, and the mechanical strength of a positive electrode becomes insufficient, and the battery performance such as cycle characteristics may be deteriorated. On the other hand, when it is too high, the battery capacity and conductivity may be reduced.

A conductive material is usually added to a positive electrode active material layer in order to enhance the conductivity.

Although there is no particular restriction on its type, specific examples thereof include a metal material, such as copper and nickel; and a carbonaceous material, such as graphite including natural graphite, and artificial graphite, carbon black including acetylene black, and amorphous carbon including needle coke.

These substances may be used singly, or in an optional combination of two or more kinds thereof at an optional ratio.

The content of the conductive material in a positive electrode active material is usually 0.01% by mass or more, and 50% by mass or less. When the content of the conductive material is too low, the conductivity may become insufficient; conversely, when it is too high, the battery capacity may sometimes decrease.

There is no particular restriction on the type of a liquid medium for forming a slurry, insofar as it is a solvent capable of dissolving or dispersing a positive electrode active material containing a lithium transition metal compound which is a positive electrode material, a binder, and a conductive material and a thickener to be used as necessary, and either of an aqueous solvent and an organic solvent may be used. Examples of the aqueous solvent include water and alcohol. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, ethylene oxide, tetrahydrofuran (THF), toluene, acetone, dimethyl ether, dimethylacetamide, hexamethylphosphalamide, dimethyl sulfoxide, benzene, xylene, quinoline, pyridine, methylnaphthalene, and hexane. In particular, when the aqueous solvent is used, it is slurried by adding a dispersing agent together with a thickener, and using a latex such as SBR.

Meanwhile, these solvents may be used singly, or in an optional combination of two or more kinds thereof at an optional ratio.

The content of a lithium transition metal compound as a positive electrode material in a positive electrode active material layer is usually 10% by mass or more, and 99.9% by mass or less. When the portion of a lithium transition metal compound in a positive electrode active material layer is too high, the strength of a positive electrode tends to be insufficient, and when the proportion is too low, the capacity may sometimes become insufficient.

The thickness of a positive electrode active material layer is usually about 10 to 200 µm.

Here, the plate density of a positive electrode according to the present invention is 3.0 g/cm$^3$ or more. Further, it is preferably 3.2 g/cm$^3$ or more, more preferably 3.3 g/cm$^3$ or more, further preferably 3.4 g/cm$^3$ or more, and particularly preferably 3.6 g/cm$^3$ or more. The upper limit is preferably 4.2 g/cm$^3$ or less because deterioration of the input/output characteristics does not occur easily, more preferably 4.1 g/cm$^3$ or less, particularly preferably 4.0 g/cm$^3$ or less, and most preferably 3.9 g/m$^3$ or less.

Increase of the plate density of a positive electrode up to the above range can be attained through compaction by roll pressing a positive electrode active material layer after coating and drying. A desired plate density can be obtained by appropriately regulating the pressure of the roll press.

[2-4. Separator]

A separator is usually interposed between a positive electrode and a negative electrode to prevent a short circuit. In this case, the nonaqueous electrolyte solution is usually used to impregnate the separator.

There is no particular restriction on the material and the shape of a separator, and any publicly known ones may be arbitrarily adopted to the extent that the effect of the present invention is not significantly impaired. Among others, it is preferable to use a separator in a form of a porous sheet or a nonwoven fabric which is superior in liquid retention and made of a material stable with respect to the nonaqueous electrolyte solution, for example, resin, glass fiber, inorganic material.

As the material for a separator made of a resin or a glass fiber, for example, polyolefin such as polyethylene or polypropylene, an aromatic polyamide, polytetrafluoroethylene, polyethersulfone, sintered glass or the like may be used. Among these, sintered glass and polyolefin are preferable, and polyolefin is more preferable. These materials may be used singly, or in an optional combination of two or more kinds thereof at an optional ratio.

Although the thickness of a separator is arbitrary, it is usually 1 µm or more, preferably 5 µm or more, and more preferably 10 µm or more. Meanwhile, it is usually 50 µm or less, preferably 40 µm or less, and more preferably 30 µm or less.

When the separator is thinner than the above range, the insulation and mechanical strength may sometimes decrease. Also, when it is thicker than the above range, not only the battery performance such as rate characteristics may sometimes be deteriorated, but also the energy density of a nonaqueous electrolyte secondary battery as a whole may sometimes decrease.

Furthermore, when a porous material such as a porous sheet or nonwoven fabric is used as a separator, the porosity of the separator is arbitrary, but is usually 20% or more, preferably 35% or more, and more preferably 45% or more. Meanwhile, it is usually 90% or less, preferably 85% or less, and more preferably 75% or less.

When the porosity is smaller than the above range, the film resistance tends to increase, and the rate characteristics tend to deteriorate. Meanwhile, when it is larger than the above range, the mechanical strength of a separator decreases and the insulation property tends to decrease.

The average pore diameter of a separator is also arbitrary, but is usually 0.5 µm or less, and preferably 0.2 µm or less. Meanwhile, it is usually 0.05 µm or more. When the average pore diameter exceeds the above range, a short circuit tends to occur. When the value is below the above range, the film resistance increases and the rate characteristics may sometimes decrease.

Meanwhile, as an inorganic material, for example, an oxide, such as alumina and silicon dioxide, a nitride, such as aluminum nitride, and silicon nitride, and a sulfate salt, such as barium sulfate and calcium sulfate, are used, and particularly those in a particulate form, or a fibrous form are used.

As for the form of a separator, that having a thin film form, such as a nonwoven fabric, a woven fabric, or a microporous film, is used. As the thin film form, that having a pore size of 0.01 to 1 µm and a thickness of 5 to 50 µm is favorably used. In addition to the aforedescribed independent thin film form, a separator prepared by forming composite porous layers containing inorganic particles described above on the outer surfaces of the positive electrode and/or the negative electrode using a resin binder may be used. For example, a porous layer may be formed on each side of the positive electrode with alumina particles having a 90% particle size of less than 1 µm using a fluorocarbon resin as a binder.

A characteristic of a separator in a nonelectrolyte secondary battery may be grasped by the Gurley value. The Gurley value indicates the difficulty of air permeability in the thickness direction of a film, and expressed by the number of seconds required for 100 mL of air to pass through the film. Therefore, a smaller value means easier permeation, and a higher value means more difficult permeation. In other words, a smaller value means that the communication in the film thickness direction is better, and a larger value means that the communication in the film thickness direction is worse. The communication means the degree of interconnection between pores in the film thickness direction. When the Gurley value of a separator of the present invention is low, it may be used in various applications. For example, in a case where the separator is used as a separator for a non-aqueous lithium secondary battery, when the Gurley value is low, the movement of lithium ions is easy, and the battery performance can be excellent, which is preferable. Although the Gurley value of the separator may be arbitrary, it is preferably from 10 to 1000 sec/100 mL, more preferably from 15 to 800 sec/100 mL, and further preferably from 20 to 500 sec/100 mL. When the Gurley value is 1000 sec/100 mL or less, the electrical resistance is substantially low, which is preferable for a separator.

[2-5. Battery Design]

<Electrode Group>

The electrode group may be either of that with a layered structure of the aforedescribed positive electrode plate and negative electrode plate interposing the aforedescribed separator, and that with a structure winding spirally the aforedescribed positive electrode plate and negative electrode plate interposing the aforedescribed separator.

The ratio of the volume of the electrode group to the internal volume of the battery (hereinafter referred to as "electrode group occupancy") is usually 40% or more, and preferably 50% or more. Meanwhile, it is usually 90% or less, and preferably 80% or less.

When the electrode group occupancy falls below the above range, the battery capacity decreases. While, when it exceeds the above range, the vacant space becomes small, and if the battery temperature increases, the components expand, or the vapor pressure of the liquid component of the electrolyte increases to raise the internal pressure, which may deteriorate various battery characteristics such as charge and discharge repeatability and high temperature storage property, or activate a gas release valve to release the internal pressure outward.

<Protection Device>

As a protection device, a PTC (Positive Temperature Coefficient) element, which resistance increases when abnormal heat generation occurs, or overcurrent flows, a thermal fuse, a thermistor, a valve (current cutoff valve) that cuts off the current flowing in a circuit activated by sudden rise of the internal pressure or the internal temperature of the battery at the occasion of abnormal heat generation, or the like may be used. It is preferable to select a protection device from the above that is not activated under the condition of normal use of high current, and a design which does not allow occurrence of abnormal heat generation or thermal runaway even without a protection device is more preferable.

<Outer Package>

A nonaqueous electrolyte secondary battery of the present invention is usually so constructed that the nonaqueous electrolyte solution, the negative electrode, the positive electrode, the separator, and other components are contained in an outer package (outer case). There is no particular restriction on the outer package, and any publicly known one can be arbitrarily adopted insofar as the effect of the present invention is not significantly impaired. Specifically, although the material of the outer package is arbitrary, usually, for example, a nickel-plated steel sheet, stainless steel, aluminum or an alloy thereof, a magnesium alloy, a metal such as nickel or titanium, or a laminated film of a resin and an aluminum foil (laminate film) is favorably used.

Examples of an outer case using the metal include that having a hermetically sealed structure formed by welding the metal members by laser welding, resistance welding, or ultrasonic welding, and that having a crimped structure with the metal members interposing a resin gasket.

Examples of an outer case using the laminate film include that having a hermetically sealed structure formed by heat-sealing the resin members. In order to improve the heat sealability, a resin different from the resin used for the laminate film may be interposed between the resin layers.

Especially, when the resin layers are heat-sealed interposing a collector terminal to form a hermetically sealed structure, since a metal to resin bonding is to be formed, a resin having polar groups, or a modified resin that has introduced polar groups may be favorably used as the interposed resin.

The shape of the outer package is also arbitrary, and may be any of a cylindrical shape, a square shape, a laminate form, a coin shape, large size, for example.

<Battery Voltage>

A nonaqueous electrolyte secondary battery of the present invention is usually used at a battery voltage of 4.0 V or higher. The battery voltage is preferably 4.1 V or higher, more preferably 4.15 V or higher, and most preferably 4.2 V or higher. This is because by increasing the battery voltage, the energy density of the battery can be increased.

On the other hand, when the battery voltage is raised, the potential of the positive electrode rises, and there arises a problem that a side reaction on the surface of the positive electrode increases. When a battery of the present invention is used, the above problem can be solved, however, if the voltage is too high, the side reaction amount on the surface of the positive electrode will become too large, and the battery characteristics will be deteriorated. Therefore, the upper limit of the battery voltage is preferably 5 V or less, more preferably 4.8 V or less, and most preferably 4.6 V or less.

<Reason Behind Exhibition of Effect of the Present Invention>

The reason behind the exhibition of the effect of the present invention is not yet very clear, but is presumed as follows.

For increasing the capacity of a battery for an automobile, use of a lithium transition metal compound with a high capacity as a positive electrode active material has been tried. Such a lithium transition metal compound with a high capacity can be obtained, for example, by decreasing the amount of Mn and increasing the amount of Ni.

However, it has been found with respect to such a positive electrode that, when a nonaqueous electrolyte secondary battery is assembled, there arises a problem, namely the capacity retention rate after high temperature storage is low, the amount of gas from storage and the amount of metal dissolution after high temperature storage increase, the resistance after high temperature storage is high, and the amount of heat generation at a high temperature is large.

The inventors investigated this problem and found the following presumable mechanism.

That is, when the amount of Mn is decreased and the amount of Ni is increased, the capacity is increased, and as a result the amount of Li in a crystal of the lithium transition metal compound at the time of charging is decreased. In this case, the oxygen atom becomes unstable and activated in the crystal of the lithium transition metal compound. For this reason, it is conceivable that the oxidation power of the positive electrode increases, and the crystal structure at the surface collapses and changes to a rock-salt structure. It has been presumed that the lithium transition metal compound with increased oxidizing power decomposes a nonaqueous electrolyte solution in the battery to cause gas generation and metal dissolution, and to increase the amount of heat generation at a high temperature. It has been also presumed that the collapse of the crystal structure at the surface of the lithium transition metal compound causes decrease in the capacity and increase in the resistance after high temperature storage.

In this regard, the inventors have found that by increasing the plate density of the positive electrode to a certain level or higher, and adding a specific phosphorus compound to the nonaqueous electrolyte solution, the destabilization of oxygen atoms in the crystal of the lithium transition metal compound may be suppressed, decrease in the capacity retention rate after high temperature storage, or the amount of gas generated by decomposition of a nonaqueous solvent of the nonaqueous electrolyte solution and the amount of metal dissolution may be suppressed, the resistance after high temperature storage may be decreased, and the amount of heat generation at high temperature may be decreased.

Although the reason for this is also not yet very clear, it is presumed that the specific phosphorus compound of the present invention becomes eventually LiF, when decomposed, and when this LiF appears in the surface of the lithium transition metal compound, it reacts with the surface of the lithium transition metal compound having increased the oxidizing power, and the destabilization of oxygen atoms in the crystal may be suppressed, decrease in the capacity retention rate after high temperature storage, the gas generation by decomposition of the nonaqueous electrolyte solution and the metal dissolution may be suppressed, the resistance after high temperature storage may be decreased, and the amount of heat generation at high temperature may be decreased.

EXAMPLES

Next, specific embodiments of the present invention will be described in more detail by way of Examples, provided that the present invention is not limited to the examples.

An abbreviation of the compound used in the examples is shown below.

Compound 1: Lithium Difluorophosphate

[Evaluation of Nonaqueous Electrolyte Secondary Battery]

Initial Charging and Discharging

In a constant temperature chamber at 25° C., a sheet-formed nonaqueous electrolyte secondary battery was charged at 0.05 C (the current value at which the rated capacity based on the 1-hour rate discharge capacity is discharged in 1 hour is defined as 1 C. The same applies hereinafter) for 4 hours, and then discharged at a constant current of 0.2 C to 2.5 V. Next, 2 cycles of a charge and discharge cycle consisting of constant current-constant voltage charging at 0.2 C up to a predetermined voltage, and constant current discharging at 0.2 C to 2.5 V, were repeated.

Furthermore, after constant current-constant voltage charging at 0.2 C up to 4.0 V, the battery was stabilized by storing it at 45° C. for 42 hours. Thereafter, the battery was discharged at constant current at 25° C. to 2.5 V, and then constant current-constant voltage charging was performed at 0.2 C up to a predetermined voltage. Thereafter, constant current discharge at 0.2 C was performed to 2.5 V, and the then discharge capacity was defined as the capacity (A) before storage. Next, constant current-constant voltage charging was performed at 0.2 C up to a predetermined voltage. The predetermined voltage is usually 4.2 V, and may be 4.3 V or 4.4 V.

Storage Test

The cell after initial charging and discharging was stored at a high temperature under conditions of 85° C. and 24 hours. After the battery was sufficiently cooled, it was immersed in an ethanol bath, and its volume was measured. The amount of gas generation was determined from the volume change before and after the storage test, and this amount was defined as the amount of gas from storage. The reduction rate of the amount of gas from storage by an additive was defined as a "suppression rate for gas from storage" (for example, Suppression rate for gas from storage (%) of Example 1=[(Amount of gas from storage of Comparative Example 1−Amount of gas from storage of Example 1)/Amount of gas from storage of Comparative Example 1]×100). The discharge capacity when this cell was subjected to constant current discharge at 0.2 C to 2.5 V in a constant temperature chamber at 25° C. was defined as the post-storage capacity (B). The ratio of the post-storage capacity (B) to the pre-storage capacity (A) was defined as "capacity retention rate after storage".

In this regard, it is preferable that the capacity retention rate after storage is as high as possible, and that the amount of gas from storage is as low as possible, because swelling of the battery can be insignificant.

Resistance after Storage Test

After the storage test, the battery was charged at constant current-constant voltage at 0.2 C up to 4.2 V, and then the resistance was measured by applying an AC voltage (0.1 Hz) at 10 mV. This was defined as "post-storage resistance", and the rate of resistance reduction by an additive was defined as "resistance suppression rate".

Amount of Metal Dissolution after Storage Test

The amount of metal dissolution was determined by analyzing quantitatively the amount of metal deposited on the negative electrode. The amount of metal deposited on the negative electrode was analyzed by ICP (high frequency inductively coupled plasma) emission spectroscopy after acid decomposition of the negative electrode to determine the total amount of metal dissolution of Ni, Mn and Co, and the reduction amount of metal dissolution by an additive was defined as "metal dissolution suppression amount".

Method for Measuring Amount of Heat Generation

A cell after initial charging and discharging was charged at constant current-constant voltage at 0.2 C up to 4.5 V, from which the positive electrode was taken out and placed into a measuring cell together with an electrolyte solution and subjected to a measurement with a Calvet calorimeter. The measurement was carried out by raising the temperature to 300° C. at 1 K/min, and the ratio of the total amount of heat generation from 100° C. and 300° C. to the charge capacity up to 4.5 V was defined as "amount of heat generation per unit capacity". Also, the rate of reduction of the amount of heat generation by an additive was defined as "heat generation suppression rate".

Method for Measuring Tap Density

For measuring the tap density of a lithium transition metal compound, a sample was dropped in a 10 mL graduated cylinder to fill its volume, followed by tapping 200 times, and the density was calculated from the then volume and the sample mass.

Method for Measuring Sulfate Salt and Carbonate Salt

A sulfate salt and a carbonate salt contained in a positive electrode active material were measured by water extraction ion chromatography.

Method for Measuring pH

For pH, 50 g of desalted water was weighed into a beaker, to which 5 g of a sample was added with stirring and the stirring was continued at 25° C. for 30 min. Thereafter, the pH was measured while maintaining the liquid temperature at 25° C.

Method for Measuring Ni Valence

The valence was calculated from the analysis of the ratio of Li to each transition metal by water extraction ion chromatography, and by inductively coupled plasma atomic emission spectrophotometry (ICP-AES).

Example

[Production of Nonaqueous Electrolyte Secondary Battery]

<Preparation of Nonaqueous Electrolyte Solution>

Thoroughly dried $LiPF_6$ was dissolved in a mixture of ethylene carbonate and ethyl methyl carbonate (volume ratio 3:7) to 1 mol/L (as a concentration in the nonaqueous electrolyte solution) in a dry argon atmosphere, in which thoroughly dried vinylene carbonate was dissolved to 2% by mass to prepare a reference nonaqueous electrolyte solution. Then, in a case the compound 1 was further dissolved therein to 1% by mass (as the concentration in the nonaqueous electrolyte solution), and in the other case the compound 1 was not added, so that totally two kinds of nonaqueous electrolyte solutions were prepared.

A nonaqueous electrolyte secondary battery was produced by the following method using either of the nonaqueous electrolyte solutions, and the following evaluations were performed.

<Production of Positive Electrode>

As a lithium nickel manganese cobalt composite oxide as a positive electrode active material, one of the following 3 kinds was used:

NMC622 ($Li_{1.00}Ni_{0.61}Mn_{0.19}Co_{0.20}O_2$: molar ratio of Mn/(Ni+Mn+Co)=0.19, molar ratio of Ni/(Ni+Mn+Co)=0.61, sulfate salt concentration=38 μmol/g, carbonate salt concentration 91 μmol/g, Ni average valence=2.63, pH of aqueous solution=11.88, tap density=2.39 g/cm$^3$), NMC532 ($Li_{1.05}Ni_{0.52}Mn_{0.29}Co_{0.20}O_2$: molar ratio of Mn/(Ni+Mn+Co)=0.29, molar ratio of Ni/(Ni+Mn+Co)=0.52, sulfate salt concentration=30 μmol/g, carbonate salt concentration=16 μmol/g, Ni average valence=2.51, pH of aqueous solution=11.75, tap density=2.39 g/m$^3$), or NMC111 ($Li_{1.05}Ni_{0.34}Mn_{0.33}Co_{0.33}O_2$: molar ratio of Mn/(Ni+Mn+Co)=0.33, molar ratio of Ni/(Ni+Mn+Co)=0.34, sulfate salt concentration=14 μmol/g, carbonate salt concentration=12 μmol/g, Ni average valence=2.15, pH of aqueous solution=11.12, tap density=1.55 g/m$^3$).

In N-methyl-2-pyrrolidon, 94 parts by mass of each positive electrode active material, 3 parts by mass of acetylene black as a conductive material, 3 parts by mass of poly(vinylidene fluoride) (PVdF) as a binder, and 0.07 part by mass of polyvinylpyrrolidone as a dispersing agent were mixed and slurried. This slurry was uniformly applied to a 15 μm-thick aluminum foil, dried, and roll-pressed to yield a positive electrode (this positive electrode is hereinafter sometimes denoted as positive electrode 1). The plate density of the positive electrode was regulated by changing the pressure of the roll press between 0 and 13 kN/cm to prepare 5 kinds of positive electrodes having the respective positive electrode densities of 2.4, 2.8, 3.0, 3.2, and 3.3 g/cm$^3$.

<Production of Negative Electrode>

To 49 parts by mass of graphite powder, 50 parts by mass of an aqueous dispersion of carboxymethylcellulose (1% by mass concentration of sodium carboxymethylcellulose) as a thickener, and 1 part by mass of an aqueous dispersion of styrene-butadiene rubber (49% by mass concentration of styrene-butadiene rubber) as a binder were added, and the mixture was mixed with a disperser to form a slurry. The obtained slurry was uniformly applied to a 10 μm-thick copper foil, dried, and roll-pressed to yield a negative electrode.

<Production of Nonaqueous Electrolyte Secondary Battery>

The aforedescribed positive electrode, negative electrode, and polyolefin separator were layered one on another in the order of negative electrode, separator, and positive electrode. The battery element thus obtained was wrapped with an aluminum laminate film, filled with the aforedescribed nonaqueous electrolyte solution, and then sealed in vacuum to form a nonaqueous electrolyte secondary battery in a sheet form. According to combinations of 3 kinds of positive electrode active materials, 5 kinds of positive electrode plate densities, and 2 kinds of nonaqueous electrolyte solutions with or without the compound 1 as set forth in Table 1, nonaqueous electrolyte secondary batteries of Examples 1 to 4, and Comparative Examples 1 to 15 were produced.

TABLE 1

|  | Positive electrode active material | Positive electrode plate density (g/cm$^3$) | Additive to electrolytic solution |
|---|---|---|---|
| Example 1 | NMC622 | 3.3 | Compound 1 |
| Example 2 | NMC532 | 3.3 | Compound 1 |
| Example 3 | NMC622 | 3.2 | Compound 1 |
| Example 4 | NMC622 | 3.0 | Compound 1 |
| Comparative Example 1 | NMC622 | 3.3 | — |
| Comparative Example 2 | NMC532 | 3.3 | — |
| Comparative Example 3 | NMC622 | 3.2 | — |
| Comparative Example 4 | NMC622 | 3.0 | — |
| Comparative Example 5 | NMC622 | 2.8 | Compound 1 |
| Comparative Example 6 | NMC622 | 2.4 | Compound 1 |
| Comparative Example 7 | NMC622 | 2.8 | — |
| Comparative Example 8 | NMC622 | 2.4 | — |
| Comparative Example 9 | NMC111 | 3.3 | Compound 1 |
| Comparative Example 10 | NMC111 | 3.2 | Compound 1 |
| Comparative Example 11 | NMC111 | 3.0 | Compound 1 |
| Comparative Example 12 | NMC111 | 2.8 | Compound 1 |
| Comparative Example 13 | NMC111 | 3.3 | — |
| Comparative Example 14 | NMC111 | 3.2 | — |
| Comparative Example 15 | NMC111 | 3.0 | — |

Table 2 shows the capacity retention rate after storage and the suppression rate for gas from storage. As obvious from Table 2, the capacity retention rate after storage is improved and the amount of the gas from storage is suppressed, when the compound 1 is added to a nonaqueous electrolyte solution of a nonaqueous electrolyte secondary battery provided with a positive electrode containing a positive electrode active material with a specific composition, and having a specific plate density. In other words, a nonaqueous electrolyte secondary battery excellent in high temperature life is obtained. In Comparative Examples 6 and 8, the capacity retention rate was as extremely low as 0.0% with 2 significant digits.

TABLE 2

|  | Positive electrode active material | Positive electrode plate density (g/cm$^3$) | Additive to electrolytic solution | Pre-storage capacity (mAh/g) | Capacity retention rate after storage (%) | Suppression rate for gas from storage (%) |
|---|---|---|---|---|---|---|
| Example 1 | NMC622 | 3.3 | Compound 1 | 173.9 | 95.7 | 69 |
| Example 2 | NMC532 |  |  | 168.6 | 95.8 | 51 |

TABLE 2-continued

| | Positive electrode active material | Positive electrode plate density (g/cm³) | Additive to electrolytic solution | Pre-storage capacity (mAh/g) | Capacity retention rate after storage (%) | Suppression rate for gas from storage (%) |
|---|---|---|---|---|---|---|
| Comparative Example 1 | NMC622 | | — | 173.1 | 95.2 | — |
| Comparative Example 2 | NMC532 | | | 167.6 | 95.1 | |
| Comparative Example 6 | NMC622 | 2.4 | Compound 1 | 162.4 | 0.0 | 55 |
| Comparative Example 8 | NMC622 | | — | 161.7 | 0.0 | — |
| Comparative Example 9 | NMC111 | 3.3 | Compound 1 | 156.4 | 93.3 | 35 |
| Comparative Example 13 | NMC111 | | — | 155.9 | 94.0 | — |

Table 3 shows the post-storage resistance and the resistance suppression rate after storage. As obvious from Table 3, the post-storage resistance is suppressed low, when the compound 1 is added to a nonaqueous electrolyte solution of a nonaqueous electrolyte secondary battery provided with a positive electrode containing a positive electrode active material with a specific composition, and having a specific plate density. Since the resistance inside the battery correlates with the amount of heat generation in the battery at the time of charging, a nonaqueous electrolyte secondary battery, which amount of heat generation at the time of charging is little even after high temperature storage, and which is therefore superior in safety, is obtained.

TABLE 3

| | Positive electrode active material | Positive electrode plate density (g/cm³) | Additive to electrolytic solution | Post-storage resistance (Ω) | Resistance suppression rate (%) |
|---|---|---|---|---|---|
| Example 3 | NMC622 | 3.2 | Compound 1 | 3.7 | 47 |
| Example 4 | | 3.0 | | 4.2 | 46 |
| Comparative Example 5 | | 2.8 | | 6.0 | 47 |
| Comparative Example 6 | | 2.4 | | 20.2 | 93 |
| Comparative Example 3 | | 3.2 | — | 6.9 | — |
| Comparative Example 4 | | 3.0 | | 7.8 | |
| Comparative Example 7 | | 2.8 | | 11.3 | |
| Comparative Example 8 | | 2.4 | | 283.9 | |
| Comparative Example 10 | NMC111 | 3.2 | Compound 1 | 4.0 | 2 |
| Comparative Example 11 | | 3.0 | | 6.9 | −6 |
| Comparative Example 14 | | 3.2 | — | 4.1 | — |
| Comparative Example 15 | | 3.0 | | 6.5 | |

Table 4 shows the amount of heat generation per unit capacity, and heat generation suppression rate. As is obvious from Table 4, the amount of heat generation per unit capacity may be suppressed low, when the compound 1 is added to a nonaqueous electrolyte solution of a nonaqueous electrolyte secondary battery provided with a positive electrode containing a positive electrode active material with a specific composition, and having a specific plate density. In other words, a nonaqueous electrolyte secondary battery, which has a high capacity, generates only a small amount of heat, and is therefore safe, has been obtained.

TABLE 4

| | Positive electrode active material | Positive electrode plate density (g/cm³) | Additive to electrolytic solution | Amount of heat generation per unit capacity (J/mAh) | Heat generation suppression rate (%) |
|---|---|---|---|---|---|
| Example 1 | NMC622 | 3.3 | Compound 1 | 9.8 | 11 |
| Comparative Example 5 | NMC622 | 2.8 | | 9.9 | 2 |
| Comparative Example 9 | NMC111 | 3.3 | | 13.2 | −11 |
| Comparative Example 1 | NMC622 | 3.3 | — | 11.1 | — |
| Comparative Example 7 | NMC622 | 2.8 | | 10.1 | |
| Comparative Example 13 | NMC111 | 3.3 | | 11.9 | |

Table 5 shows the metal dissolution suppression amount. As obvious from Table 5, the metal dissolution suppression effect is strengthened, when the compound 1 is added to a nonaqueous electrolyte solution of a nonaqueous electrolyte secondary battery provided with a positive electrode containing a positive electrode active material with a specific composition, and having a specific plate density. In other words, a nonaqueous electrolyte secondary battery, in which metal dissolution from the positive electrode is insignificant, and which is therefore safe and has a high capacity, has been obtained.

TABLE 5

| | Positive electrode active material | Positive electrode plate density (g/cm³) | Additive to electrolytic solution | Metal dissolution suppression amount (μmol) |
|---|---|---|---|---|
| Example 1 | NMC622 | 3.3 | Compound 1 | 0.36 |
| Comparative Example 5 | NMC622 | 2.8 | | 0.34 |
| Comparative Example 9 | NMC111 | 3.3 | | 0.17 |
| Comparative Example 12 | NMC111 | 2.8 | | 0.04 |

Example 5

[Production of Nonaqueous Electrolyte Secondary Battery]
<Preparation of Nonaqueous Electrolyte Solution>

Thoroughly dried $LiPF_6$ was dissolved in a mixture of ethylene carbonate and ethyl methyl carbonate (volume ratio 3:7) to 1 mol/L (as a concentration in the nonaqueous electrolyte solution) in a dry argon atmosphere, in which 2% by mass of thoroughly dried vinylene carbonate and 1% by mass of the compound 1 (as the concentration in the nonaqueous electrolyte solution) were further dissolved to prepare a nonaqueous electrolyte solutions.

A nonaqueous electrolyte secondary battery was produced by the following method using the nonaqueous electrolyte solution, and the following evaluations were performed.
<Production of Positive Electrode>

As a positive electrode active material, 90 parts by mass of a lithium nickel manganese cobalt composite oxide ($Li_{1.00}Ni_{0.61}Mn_{0.19}Co_{0.20}O_2$: molar ratio of Mn/(Ni+Mn+Co)=0.19, molar ratio of Ni/(Ni+Mn+Co)=0.61, sulfate salt concentration=38 μmol/g, carbonate salt concentration 91 μmol/g, Ni average valence=2.63, pH of aqueous solution=11.88, tap density=2.39 g/cm³), as a conductive material 7 parts by mass of acetylene black, as a binder 3 parts by mass of poly(vinylidene fluoride) (PVdF), and as a dispersing agent 0.07 part by mass of polyvinylpyrrolidone were mixed in N-methyl-2-pyrrolidon, and slurried. This slurry was uniformly applied to a 15 μm-thick aluminum foil, dried, and roll-pressed to yield a positive electrode (this positive electrode is hereinafter sometimes denoted as positive electrode 6). The plate density of the positive electrode 6 was 3.3 g/cm³.
<Production of Negative Electrode>

The respective negative electrodes of Examples 5 and 6, and Comparative Example 16 were produced in the same manner as in Examples 1 to 4, and Comparative Examples 1 to 15.
<Production of Nonaqueous Electrolyte Secondary Battery>

The respective nonaqueous electrolyte secondary batteries in a sheet form of Examples 5 and 6, and Comparative Example 16 were produced in the same manner as in Examples 1 to 4, and Comparative Examples 1 to 15.

Comparative Example 16

A nonaqueous electrolyte secondary battery was produced in the same manner as in Example 5 except that Compound 1 was not added in the nonaqueous electrolyte solution.

The capacity retention rate after storage, the amount of gas from storage, and the amount of metal dissolution after the storage test of Example 6 and Comparative Example 16 are shown in Table 6.

Example 6

A positive electrode (this positive electrode is hereinafter sometimes denoted as positive electrode 7) was produced in the same manner as in Example 5, except that the lithium nickel manganese cobalt composite oxide ($Li_{1.05}Ni_{0.52}Mn_{0.29}Co_{0.20}O_2$: molar ratio of Mn/(Ni+Mn+Co)=0.29, molar ratio of Ni/(Ni+Mn+Co)=0.52, sulfate salt concentration=30 μmol/g, carbonate salt concentration=16 μmol/g, Ni average valence=2.51, pH of aqueous solution=11.75, tap density=2.39 g/cm³) was used as a positive electrode active material, and a nonaqueous electrolyte secondary battery was produced in the same manner as in Example 5, except that the above positive electrode was used. In this regard, the plate density of the positive electrode 7 was 3.3 g/cm³.

Comparative Example 17

A nonaqueous electrolyte secondary battery was produced in the same manner as in Comparative Example 16 except that positive electrode 7 used in Example 6 above was used.

The capacity retention rate after storage, the suppression rate for gas from storage, and the amount of metal dissolution after the storage test of Example 6 and Comparative Example 17 are shown in Table 7.

TABLE 6

| | Electrolyte solution | Additive | Voltage (V) | Pre-storage capacity (mAh/g) | Capacity retention rate after storage (%) | Suppression rate for gas from storage (%) | Amount of metal dissolution after storage (μmol) |
|---|---|---|---|---|---|---|---|
| Example 5 | 1 mol/L LiPF$_6$ EC/EMC = 3/7 + 2% VC | Compound 1 | 4.2 | 173.9 | 95.7 | 69 | — |
| | | | 4.3 | 187.1 | 94.7 | 55 | — |
| | | | 4.4 | 197.3 | 92.7 | 21 | 2.3 |
| Comparative Example 16 | | — | 4.2 | 173.1 | 95.2 | — | — |
| | | | 4.3 | 186.3 | 94.1 | — | — |
| | | | 4.4 | 197.3 | 92.2 | — | 4.8 |

TABLE 7

| | Electrolyte solution | Additive | Voltage (V) | Pre-storage capacity (mAh/g) | Capacity retention rate after storage (%) | Suppression rate for gas from storage (%) | Amount of metal dissolution after storage (μmol) |
|---|---|---|---|---|---|---|---|
| Example 6 | 1 mol/L LiPF$_6$ EC/EMC = 3/7 + 2% VC | Compound 1 | 4.2 | 168.6 | 95.8 | 51 | — |
| | | | 4.3 | 180.5 | 95.0 | 29 | — |
| | | | 4.4 | 191.2 | 93.3 | 3 | 2.0 |
| Comparative Example 17 | | — | 4.2 | 167.6 | 95.1 | — | — |
| | | | 4.3 | 180.1 | 94.1 | — | — |
| | | | 4.4 | 190.4 | 91.9 | — | 5.5 |

As obvious from Table 6, the capacity retention rate after storage is enhanced, the gas amount from storage is suppressed, and the amount of metal dissolution is reduced, when the compound 1 is added to a nonaqueous electrolyte solution of a nonaqueous electrolyte secondary battery provided with a positive electrode having a specific plate density and containing a positive electrode active material which has a specific composition, and contains a specific amount of a sulfate salt. In other words, a nonaqueous electrolyte secondary battery, which is excellent in high temperature life, and in which the amount of heat generation at a high temperature is small, has been obtained.

As obvious from Table 7, the capacity retention rate after storage is enhanced, the gas amount from storage is suppressed, and the amount of metal dissolution is reduced, when the compound 1 is added to a nonaqueous electrolyte solution of a nonaqueous electrolyte secondary battery provided with a positive electrode containing a sulfate salt. In other words, a nonaqueous electrolyte secondary battery, which is excellent in high temperature life, and in which the amount of heat generation at a high temperature is small, has been obtained.

The invention claimed is:

1. A nonaqueous electrolyte secondary battery comprising:
a positive electrode with a positive electrode active material capable of absorbing and releasing a metal ion;
a negative electrode with a negative electrode active material capable of absorbing and releasing a metal ion; and
a nonaqueous electrolyte solution; wherein
the positive electrode active material comprises a lithium transition metal compound, and the positive electrode active material comprises at least Ni, Mn and Co, wherein the molar ratio of Mn/(Ni+Mn+Co) is larger than 0 and 0.32 or less, the molar ratio of Ni/(Ni+Mn+Co) is 0.55 or more and 0.95 or less,
the plate density of the positive electrode is 3.0 g/cm$^3$ or more;
the nonaqueous electrolyte solution comprises a monofluorophosphate and/or a difluorophosphate, and
a total content of the monofluorophosphate and/or difluorophosphate is 0.01% by mass or more in terms of the concentration in the nonaqueous electrolyte solution.

2. The nonaqueous electrolyte secondary battery according to claim 1, wherein the positive electrode active material comprises a lithium transition metal compound represented by the following Formula (I):

$$Li_{1+x}MO_2 \qquad (I)$$

wherein,
x is from −0.05 to 0.06, and M comprises at least Ni, Mn and Co.

3. The nonaqueous electrolyte secondary battery according to claim 2, wherein the x is 0.028 or less.

4. The nonaqueous electrolyte secondary battery according to claim 1, wherein the molar ratio of Mn/(Ni+Mn+Co) is 0.28 or less.

5. The nonaqueous electrolyte secondary battery according to claim 1, wherein the molar ratio of Ni/(Ni+Mn+Co) is 0.55 or more.

6. The nonaqueous electrolyte secondary battery according to claim 1, wherein the plate density of the positive electrode is 3.2 g/cm$^3$ or more.

7. The nonaqueous electrolyte secondary battery according to claim 1, wherein the positive electrode active material further contains a sulfate salt.

8. The nonaqueous electrolyte secondary battery according to claim 7, wherein the amount of the sulfate salt contained in the positive electrode active material is 15 μmol/g or more.

9. The nonaqueous electrolyte secondary battery according to claim 1, wherein an average Ni valence of the lithium transition metal compound is 2.1 or more and 3 or less in an uncharged state.

10. The nonaqueous electrolyte secondary battery according to claim 1, wherein the pH of an aqueous solution of the lithium transition metal compound is 11 or higher based on a liquid temperature of 25° C.

11. The nonaqueous electrolyte secondary battery according to claim 1, wherein the positive electrode active material contains a carbonate salt at 10 μmol/g or more.

12. The nonaqueous electrolyte secondary battery according to claim 1, wherein a tap density of the lithium transition metal compound is 1.8 g/cm$^3$ or more.

* * * * *